(12) United States Patent
Khasnabish et al.

(10) Patent No.: US 11,290,891 B2
(45) Date of Patent: Mar. 29, 2022

(54) SYSTEMS AND METHODS FOR UBIQUITOUS AVAILABILITY OF HIGH QUALITY STATEFUL SERVICES ACROSS A NETWORK

(71) Applicant: Verizon Patent and Licensing Inc., Arlington, VA (US)

(72) Inventors: Bhumip Khasnabish, Lexington, MA (US); Rohit Shirish Saraf, Nashua, NH (US)

(73) Assignee: Verizon Patent and Licensng Inc., Basking Ridge, NJ (US)

( * ) Notice: Subject to any disclaimer, the term of this patent is extended or adjusted under 35 U.S.C. 154(b) by 0 days.

(21) Appl. No.: 16/850,507

(22) Filed: Apr. 16, 2020

(65) Prior Publication Data

US 2021/0329466 A1 Oct. 21, 2021

(51) Int. Cl.
*H04W 16/14* (2009.01)
*H04W 16/10* (2009.01)
*H04W 24/02* (2009.01)
*H04W 72/04* (2009.01)
*H04W 48/18* (2009.01)

(52) U.S. Cl.
CPC ........... *H04W 16/14* (2013.01); *H04W 16/10* (2013.01); *H04W 24/02* (2013.01); *H04W 48/18* (2013.01); *H04W 72/0453* (2013.01)

(58) Field of Classification Search
CPC ..... H04W 16/14; H04W 16/10; H04W 24/02; H04W 48/18; H04W 72/0453
See application file for complete search history.

(56) References Cited

U.S. PATENT DOCUMENTS

| | | | |
|---|---|---|---|
| 2017/0026800 A1* | 1/2017 | Kim | H04W 4/80 |
| 2019/0052308 A1* | 2/2019 | Niu | H04B 1/7143 |
| 2020/0092210 A1* | 3/2020 | Thanneeru | H04W 28/0247 |
| 2020/0128555 A1* | 4/2020 | Kreiner | H04W 72/085 |
| 2020/0235898 A1* | 7/2020 | Loehr | H04L 5/0098 |

* cited by examiner

*Primary Examiner* — Joshua L Schwartz

(57) ABSTRACT

Provided are systems and methods for performing dynamic spectrum allocation and state shifting in order to provide high quality stateful services to user equipment ("UE") that access the stateful services from different network locations. The dynamic spectrum allocation and state shifting may include tracking mobility of a UE accessing a stateful service using a first allocation of spectrum from a first Radio Access Network ("RAN"), predicting continued stateful service access via a second RAN, determining latency requirements of the stateful service, selecting a second allocation of spectrum at the second RAN with a frequency range that provides a first amount of latency, transferring the stateful service state to a Multi-Access Edge Computing ("MEC") location that provides a second amount of latency for services accessed via the second RAN such that the first and second amounts of latency satisfy the performance requirements of the stateful service.

21 Claims, 12 Drawing Sheets

SYSTEMS AND METHODS FOR UBIQUITOUS AVAILABILITY OF HIGH QUALITY STATEFUL SERVICES ACROSS A NETWORK

BACKGROUND

Wireless networks may provide voice and/or data services that may be used by a variety of applications and devices. Autonomous vehicles, robotics, augmented or virtual reality systems, or industrial machinery may be examples of devices that access the voice and/or data services of wireless networks for applications such as autonomous driving, robotic coordination, cloud computing, etc. (e.g., in addition to services such as voice calling, Internet browsing, or media streaming). These different applications and devices may have different requirements with respect to bandwidth, latency, reliability, and/or other factors associated with different services that may be accessed via a wireless network.

DETAILED DESCRIPTION OF THE PREFERRED EMBODIMENTS

Figure 1A:
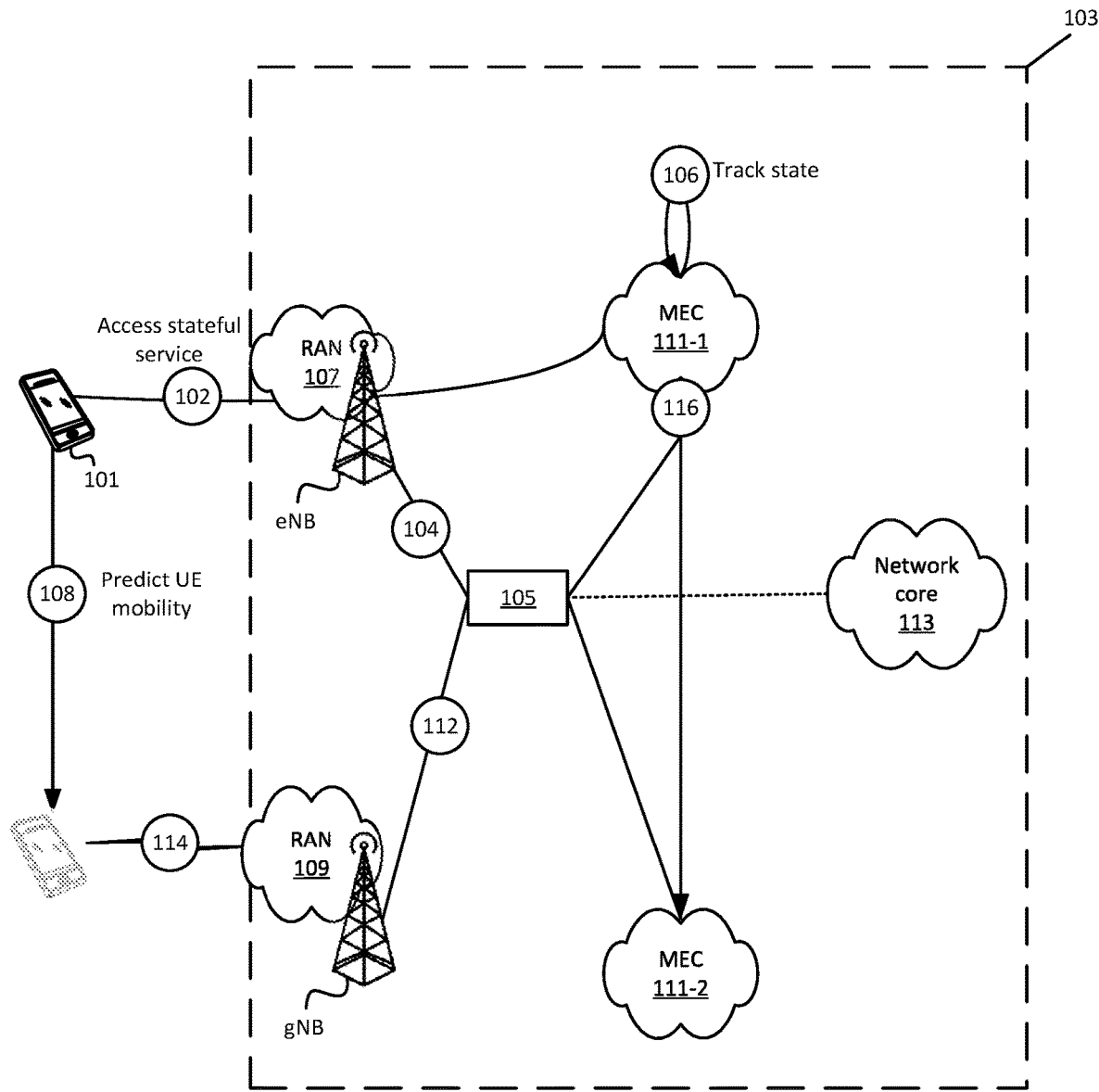
FIG. 1A illustrates an example for providing high quality stateful services across a network via dynamic spectrum allocation and state shifting in accordance with some embodiments presented herein.

The following detailed description refers to the accompanying drawings. The same reference numbers in different drawings may identify the same or similar elements.

Systems and/or methods, as described herein, may provide high quality stateful services to user equipment ("UE") that access the stateful services from different network locations, and/or may dynamically reallocate resources for the UE at a stationary location based on changing performance requirements of accessed services. As discussed below, some embodiments may include performing a multipart optimization process that involves dynamically allocating spectrum and shifting service state for continued low latency access of a stateful service by the UE.

As referred to herein, a "stateful service" may be a service in which data, that is provided to a UE, may be selected, determined, modified, calculated, etc., based on data previously received from the UE. In some embodiments, a stateful service may be continuously accessed from different network locations as the UE moves across different neighboring coverage areas associated with the network. In some embodiments, a stateful service may be stopped or paused with a first state at a first network location, and may be seamlessly resumed from the first state at a non-neighboring second network location.

An example stateful service may include an online game that is executed by one or more devices that are within or accessible from the network and that are remote to the UE used by a user to access or play the game. In this example, the service state may include the user's last position in the game, settings, player values (e.g., health points, stock of consumable items, etc.), score, and/or other tracked data with which the game can be resumed at a different time, from a different UE, or from a different network location without any loss of continuity. Other examples of stateful services may include autonomous driving services, robotic control services, virtual reality or augmented reality applications, or other suitable services or applications. Service states for autonomous driving may include tracking a vehicle's last location, routes traveled, early detected obstacles, and/or states of other vehicles. Generally, "service state" may include data that tracks output, progression, and/or positioning of a stateful service, and/or may include data that is used to continue and/or resume the stateful service based on the output, progressions, and/or positioning that has already occurred.

Some stateful services may be "latency-sensitive services." Latency-sensitive services may include services that require latency below a threshold level (e.g., less than 20 milliseconds ("ms") of latency, less than 10 ms, or some other threshold value). For instance, user input that arrives with more than 20 ms of network-added latency in a fast-paced game may result in reduced gaming responsiveness and/or input for a state in the game that has since changed. Similarly, 20 ms or more of network-added latency can adversely affect autonomous driving by slowing obstacle and/or collision detection and the actions needed to avoid an obstacle and/or collision. Accordingly, latency-sensitive services may include services whose execution may be negatively impacted by latencies greater than a threshold amount (e.g., 20 ms). In contrast, "latency-insensitive services" may include services that are not necessarily affected by latencies greater than a threshold amount (e.g., 20 ms). Latency-insensitive services may include website access, email access, video/streaming access, or the like.

In some embodiments, the dynamic spectrum allocation of the multi-part optimization process may include dynamically adapting stateful service access based on different radio access technologies ("RATs"), that are supported by different Radio Access Networks ("RANs") providing service access at the different network locations, and/or based on the spectrum that is available at each RAN. In some embodiments, dynamically adapting the stateful service access may include accounting for different performance characteristics (e.g., latencies) of the different RATs and the different spectrum frequencies that are supported by each particular RAN, tracking the performance requirements of services that are currently accessed or are predicted to be accessed from the particular RAN by different UEs, and/or prioritizing the allocation of the RATs and spectrum frequencies at the particular RAN. Prioritizing the allocation of the RATs and spectrum frequencies may include reserving and/or allocating the different RATs and spectrum frequencies based on their respective performance characteristics so that the different performance requirements of stateful latency-sensitive services, latency-insensitive services, and/or other services accessed from that particular RAN are satisfied.

For example, the dynamic spectrum allocation of some embodiments may include dynamically switching a UE from a Long-Term Evolution ("LTE") or Fourth Generation ("4G") RAT (referred to herein simply as a "4G RAT") to a Fifth Generation ("5G") Next Radio ("NR") RAT when the UE supports the 5G RAT, accesses a latency-sensitive service, and moves into the coverage area of a RAN that supports the 5G RAT. The 5G RAT may, in some instances, be capable of providing service with lower latencies than the 4G RAT. Continuing with the example, the dynamic spectrum allocation of some embodiments may further include allocating higher frequency and lower latency spectrum (e.g., millimeter-wave spectrum operating at 24 gigahertz ("GHz") frequencies and above, or mid-band spectrum operating between 1 and 6 gigahertz ("GHz") frequencies) instead of low-band spectrum, that operates below 1 GHz frequencies.

In some embodiments, the dynamic spectrum allocation may be performed in conjunction with dynamic spectrum sharing ("DSS"). The DSS of some embodiments allows a RAN to reuse the same frequencies or blocks of spectrum (e.g., physical resource blocks ("PRBs") associated with different spectrum bands) with different RATs. For instance, a particular block of spectrum (e.g., a 10 megahertz ("MHz"), 25 MHz, 100 MHz, etc. block of spectrum within a supported RF range) may be used to carry 4G signaling from a first UE at a first time and 5G signaling from a second UE at a second time, thereby freeing the particular block of spectrum for dynamic allocation to UEs supporting any of the RATs that are supported by that RAN. Without DSS, the dynamic spectrum allocation may be more restrictive in that a first block of spectrum (e.g., a first set of frequency ranges) may be dynamically allocated to UEs that support a first RAT, and a second block spectrum may be dynamically allocated to UEs that support a second RAT.

In some embodiments, service state shifting may include transferring a state for a particular stateful service between different network edge compute locations or sites, referred to herein as different Multi-Access Edge Computing facilities ("MECs"), where execution of the particular stateful service may be localized at different times relative to different locations from which a UE accesses the particular stateful service. More specifically, the service state shifting may include transferring information, associated with a current state of the particular stateful service that is accessed by a particular UE, across different MECs, so that the particular UE can access the particular stateful service with the current state from whichever MEC is closest to the particular UE and/or from whichever MEC provides fastest performance (e.g., lowest latency) to the particular UE. By shifting service states between MECs in diverse locations, the particular UE may continuously access or resume the particular stateful service from different localized nodes of the network without interruption and with lower latency than accessing the particular stateful service from a centralized remote node within the network core.

FIG. 1A illustrates an example for providing high quality stateful services across a network via dynamic spectrum allocation and state shifting in accordance with some embodiments presented herein. As shown in FIG. 1A, UE 101 may access a particular stateful service from different locations of network 103. UE 101 may include a mobile phone, tablet, computer, gaming device, and/or other type of device for accessing the particular stateful service from network 103 at different times or from the different network locations. Network 103 may include service optimization controller 105, 4G RAN 107, 5G RAN 109, distributed MECs 111-1 and 111-2 (sometimes referred to individually as "MEC 111" or collectively as "MECs 111"), and a wireless telecommunication network core 113. In practice, one or more other types of RANs may be used in addition to, or in lieu of, 4G RAN 107 and/or 5G RAN 109 (e.g., RANs that implement other RATs). Network 103 may represent a 5G New Radio ("NR") Non-Standalone Access ("NSA") architecture, and/or some other architecture in which multiple RATs are provided. In some embodiments, network 103 may be implemented using a Standalone 5G architecture or another architecture (e.g., some other architecture that provides wireless service according to a single RAT).

Service optimization controller 105 may ensure that performance requirements of the particular stateful service are satisfied regardless of where UE 101 accesses the particular stateful service. Service optimization controller 105 may ensure that the performance requirements are satisfied by directing the dynamic spectrum allocation for optimal use of the different RATs and/or spectrum supported by RANs 107 and 109, and/or by shifting the service state in order to localize execution of the particular stateful service without loss of state at different MECs 111.

4G RAN 107 may include one or more base stations, some or all of which may take the form of an eNodeB ("eNB"), that allocate 4G radio spectrum for UE 101 and/or other UEs that have 4G radios, support 4G signaling, and are in range of 4G RAN 107. In some implementations, the 4G radio spectrum may include spectrum in the low-band 600 MHz-1 GHz radio frequency ("RF") range and/or in the mid-band 1 GHz-6 GHz RF range.

5G RAN 109 may include one or more base stations, some or all of which may take the form of a gNodeB ("gNB"), that allocate 5G radio spectrum for UE 101 and/or other UEs that have 5G radios and are in range of 5G RAN 109. In some implementations, the 5G radio spectrum may include spectrum in the low-band 600 MHz-1 GHz RF range, in the mid-band 1 GHz-6 GHz RF range, and/or in the high-band 24 GHz-300 GHz RF range (also referred to as "millimeter wave" or "mmWave"). 5G RAN 109 may also allocate the same RF frequencies for use as 4G radio spectrum for UEs that may not support 5G connectivity or may be out of 5G frequency range. In particular, 5G RAN 109 may perform DSS so that the same frequencies can be dynamically reallocated to carry 4G signaling or 5G signaling. In some other embodiments, 5G RAN 109 may specifically allocate a subset of the frequencies for 4G signaling and a different subset of the frequencies for 5G signaling.

UE 101 may initiate access (at 102) to the particular stateful service using 4G signaling that is communicated via the 4G radio spectrum allocated by 4G RAN 107 at a first time when UE 101 is within range of 4G RAN 107. Initiating access (at 102) may include starting a new instance of the particular stateful service, wherein the new instance is not based on prior state. For instance, UE 101 may issue a request to start the particular stateful service. The request may be issued as a HyperText Transfer Protocol ("HTTP") message with a Uniform Resource Locator ("URL") that is associated with the particular stateful service.

MEC 111-1 may include localized resources that are part of or are physically located near physical components of 4G RAN 107 and/or other RANs (e.g., near one or more eNBs, gNB s, etc.). The localized resources of MEC 111-1 may include one or more devices or systems that provide caching resources for localized delivery of content and services, computing resources for localized execution of functions and services, and/or other resources for localized access to services that may be requested and/or accessed by UEs.

In some embodiments, the localized resources of MECs 111 may be limited (e.g., relative to resources of network core 113 and/or external data networks with resources outside of network 103), and therefore may be used to selectively provide latency-sensitive services including the particular stateful service requested by UE 101. In some embodiments, the localized resources of MECs 111 may be used to execute the particular stateful service and/or other latency-sensitive services with less latency than network core 113, for example, because of the fewer network hops that the service data traverses in order to reach MECs 111 than network core 113. Latency-insensitive services and/or stateless services may be provided using the resources of network core 113 and/or external data networks without degrading the user experience. In some embodiments, the localized resources of MECs 111 may be used to track service state and to provide the service state to resources of a third-party cloud platform that are used to execute the stateful service based on the service state.

Service optimization controller 105 may track (at 104) the spectrum utilization by UE 101 at 4G RAN 107. For instance, service optimization controller 105 may track the periodicity and/or rate at which signaling is exchanged between UE 101 and 4G RAN 107 for the particular stateful service and/or the percentage of the allocated spectrum that is used by UE 101 over one or more time intervals. Based on the tracked spectrum utilization, service optimization controller 105 may determine latency requirements of the particular stateful service. For example, service optimization controller 105 may determine that the particular stateful service is a latency-sensitive service based on UE 101 using the allocated spectrum to repeatedly transmit multiple messages less than a certain specified threshold apart (e.g., 20 ms apart). Additionally, or alternatively, service optimization controller 105 may determine that the particular stateful service is a latency-sensitive service based on UE 101 using more than a specified threshold percentage of allocated spectrum over a time interval (e.g., 90% of the allocated spectrum over a ten second interval).

In some embodiments, service optimization controller 105 may also determine supported RATs and spectrum blocks (e.g., low-band, mid-band, and/or high-band frequencies) of UE 101. The additional information may be obtained from 4G RAN 107 (as part of or separate from the tracked spectrum utilization) and/or components of network core 113.

MEC 111-1 may track (at 106) a state associated with the particular stateful service. In some embodiments, MEC 111-1 may track (at 106) the state based on the particular stateful service executing locally using resources of MEC 1110-1. In some such embodiments, MEC 111-1 may also track (at 106) utilization of the resources used to locally execute the particular stateful service. In some embodiments, MEC 111-1 may track (at 106) the state based on data collected from a remote node or cloud instance where the particular stateful service is executed.

With regards to service state, MEC 111-1 may track previously submitted data from UE 101 that pertains to the particular stateful service (e.g., configuration data, settings, service input, etc.), and/or changes and progression within the particular stateful service (e.g., a position, time, score, result, current configuration, etc.) as a result of prior access by UE 101.

With regards to utilization of resources associated with MEC 111-1, MEC 111-1 may track average, peak, and/or other measures of central processor unit ("CPU") resources associated with MEC 111, graphics processing unit ("GPU") resources, memory resources, storage resources, network bandwidth resources, and/or other utilization of localized resources of MEC 111-1 used in providing the particular stateful service to UE 101. In some embodiments, MEC 111-1 may create a data structure, record, or file for UE 101 or the associated user, and may enter relevant state information for the particular stateful service into the data structure, record, or file.

Service optimization controller 105 may track UE 101 mobility in conjunction with one or more components of network 103. For instance, service optimization controller 105 may track UE 101 mobility based on Radio Resource Control ("RRC") signaling compiled from 4G RAN 107, 5G RAN 109, and/or other RANs, other measures of signal quality, and/or location services of network 103 and/or UE 101. Similarly, service optimization controller 105 may track UE 101 mobility based on location information that is obtained from an Access and Mobility Management Function ("AMF"), Mobility Management Entity ("MME"), Session Management Function ("SMF"), and/or other components of network 103.

Service optimization controller 105 may use the mobility tracking information to predict (at 108) UE 101 moving within the coverage area of 5G RAN 109 and/or UE 101 continuing or resuming access of the particular stateful service via 5G RAN 109. Service optimization controller 105 may then track (at 112) actual and/or expected spectrum utilization at 5G RAN 109 in order to prioritize (at 114) available spectrum at 5G RAN 109 for UE 101 and other UEs to access services with different performance requirements.

Prioritizing (at 114) the available spectrum at 5G RAN 109 may include performing an intelligent allocation of spectrum based on the available spectrum and/or RATs supported by 5G RAN 109, spectrum and/or RATs supported by UEs accessing services via 5G RAN 109, and the performance requirements of the services accessed by those UEs. As described above, the performance requirements for the particular stateful service accessed by UE 101 may be derived based on the tracked spectrum utilization data for UE 101 accessing the particular stateful service while connected to 4G RAN 107. Similarly, the performance requirements for services that are currently being accessed from 5G RAN 109 may be derived based on the tracked spectrum utilization data that is obtained from 5G RAN 109.

UEs that access latency-sensitive services may be allocated higher frequency spectrum (e.g., high-band or higher frequency mid-band spectrum) and/or a 5G RAT, and UEs that access latency-insensitive service may be allocated lower frequency spectrum (e.g., low-band or lower frequency mid-band spectrum) and/or a 4G RAT. For instance, prioritization (at 114) of the available spectrum at 5G RAN 109 may include reserving spectrum for 5G signaling at the higher frequencies of the mid-band RF range for UE 101 based on the particular stateful service being classified as a latency-sensitive service, UE 101 supporting low-band and mid-band RF ranges, and UE 101 having 4G and 5G radios. The higher frequencies of the mid-band RF range (e.g., 6 GHz frequencies) travel faster and with less latency than the lower frequencies of the mid-band RF range (e.g., 1 GHz frequencies) or low-band RF range, and may therefore satisfy the low latency performance requirements of the particular stateful service. Similarly, the 5G signaling may satisfy the low latency performance requirements of the particular stateful service due to the 5G RAT. For example, some control plane and/or user plane functionalities may be performed by 5G RAN 109 and/or MEC 111-2 instead of by elements of network core 113.

In some embodiments, prioritization (at 114) of the available spectrum may include service optimization controller 105 performing a "soft" allocation of the spectrum at 5G RAN 109 prior to UE 101 connecting to 5G RAN 109 (e.g., in response to predicting (at 108) UE 101 moving within the coverage area of 5G RAN 109), and committing the soft-allocated spectrum to UE 101 upon UE 101 handing over or connecting to 5G RAN 109. In some other embodiments, prioritization (at 114) of the available spectrum may include service optimization controller 105 selecting and allocating spectrum at 5G RAN 109 for use by UE 101 upon handover or initial connection of UE 101 to 5G RAN 109. By supporting DSS, service optimization controller 105 and/or 5G RAN 109 may reserve and/or allocate the same spectrum to carry 5G signaling from UE 101 and 4G signaling from one or more other UEs, thereby allowing the same spectrum to be dynamically repurposed based on RATs supported by the UEs and made available to all UEs regardless of the RATs supported by the UEs. In some embodiments, service optimization controller 105 may control the dynamic spectrum allocation and/or prioritization (at 114) of spectrum at 5G RAN 109 via instructions provided to 5G RAN 109, AMF, MME, SMF, and/or other components of network 103 involved in connection establishment and/or management procedures.

In response to predicting (at 108) UE 101 moving within the coverage area of 5G RAN 109, service optimization controller 105 may determine that MEC 111-2 may be fewer network hops from 5G RAN 109 and/or that MEC 111-2 may provide faster performance to UEs accessing services via 5G RAN 109 than MEC 111-1 or network core 113. MEC 111-2 may include resources for localizing service execution and/or service state access for UEs accessing low latency services via 5G RAN 109.

Accordingly, service optimization controller 105 may trigger the transfer (at 116) of the state for the particular stateful service accessed by UE 101 from MEC 111-1 to MEC 111-2. In some embodiments, service optimization controller 105 may delay transferring (at 116) the service state until UE 101 is handed off from 4G RAN 107, UE 101 disconnects from 4G RAN 107, and/or UE 101 stops or pauses access to the particular stateful service when connected to 4G RAN 107.

In some embodiments, transferring (at 116) the state may include providing (at 116) a copy of the particular stateful service to MEC 111-2 for instantiation and subsequent execution of the particular stateful service using resources of MEC 111-2. For instance, service optimization controller 105 may provide MEC 111-2 a container, package, script, code, application, and/or executable instance of the particular stateful service to MEC 111-2. The last tracked state, that is transferred from MEC 111-1, may be used to configure the particular stateful service at MEC 111-2 with a particular set of data and/or may be used to resume execution at a particular point within the particular stateful service.

As a result of the dynamic spectrum allocation and state shifting performed by service optimization controller 105, UE 101 may continue and/or resume the particular stateful service access using the spectrum allocated by 5G RAN 109 and localized state access and/or service execution at MEC 111-2. Moreover, the allocated spectrum may result in a first amount of latency for messaging exchanged with 5G RAN 109, the transferred state to MEC 111-2 may result in a second amount of latency for services accessed via 5G RAN 109, and the total of the first and second amounts of latency may satisfy the latency and/or performance requirements of the particular stateful service.

Figure 1B:
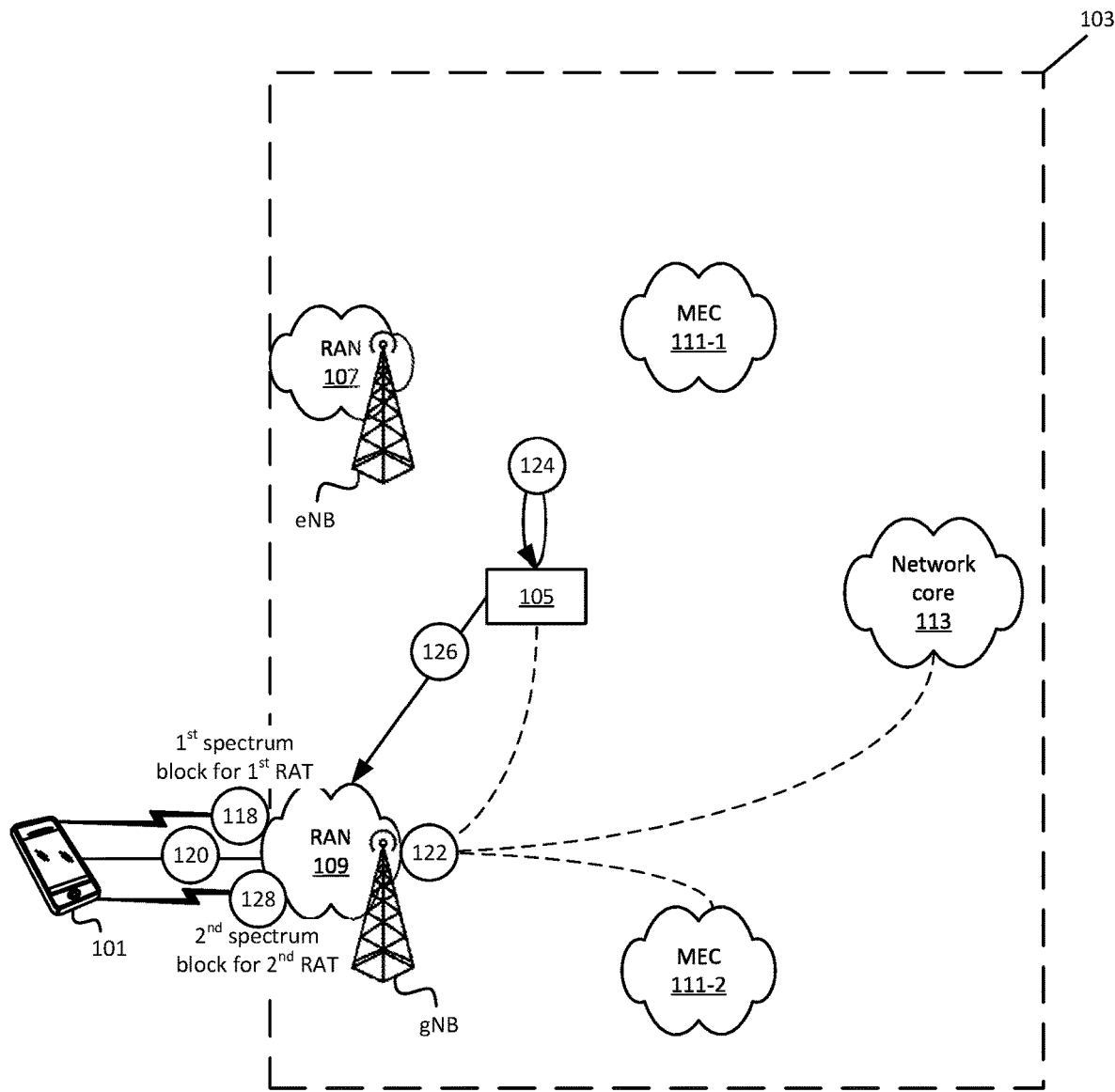
FIG. 1B illustrates an example of service optimization controller dynamically changing the spectrum allocation based on a latency requirement of a service accessed by user equipment ("UE") in accordance with some embodiments presented herein.

In some embodiments, service optimization controller 105 may continue to monitor and/or optimize the spectrum and/or RAT allocation while UE 101 is stationary and accessing the particular stateful service and/or other services from 5G RAN 109. FIG. 1B illustrates an example of service optimization controller 105 dynamically changing the spectrum allocation based on a latency requirement of a service accessed by UE 101 via 5G RAN 109 in accordance with some embodiments presented herein.

As shown in FIG. 1B, 5G RAN 109 may provide (at 118) UE 101 with a first allocation of spectrum. The first allocation of spectrum may include a first block of spectrum that can be used with either a first RAT or a second RAT. In this example, the first allocation of spectrum may be configured for use with the first RAT.

In some embodiments, the first allocation may be based on service optimization controller 105 determining that UE 101 is to access the particular stateful service via 5G RAN 109, determining that the particular stateful service corresponds to a latency-sensitive service, and selecting the first block of spectrum (from available low-band, mid-band, and/or high-band frequencies) for use with the first RAT in order to provide latency less than a specified threshold (e.g., 20 ms) for the latency-sensitive service. In some embodiments, the first allocation may be provided upon or prior to UE 101 requesting access to any service, when service optimization controller 105 does not track prior service usage of UE 101, and/or when service optimization controller 105 is unable to determine with a certain degree of confidence the one or more services that UE 101 is expected to access while connected via 5G RAN 109.

UE 101 may issue (at 120) a request using the allocated first block of spectrum and/or first RAT. Service optimization controller 105 may receive (at 122) an indication of the request, and may determine that the request is for accessing a service from network 103.

Service optimization controller 105 may determine a latency requirement of the service. For instance, service optimization controller 105 may store a mapping table that identifies different services as latency-sensitive or latency-insensitive, or may track latency requirements of different services based on prior access of the services by UE 101 and/or other UEs. In some embodiments, the latency requirement for a service may be specified in the request URL, in a configuration file associated with the service, metadata, and/or other data that is associated with the service.

Service optimization controller 105 may determine (at 124) to use a different second allocation of spectrum and/or a second RAT instead of the first allocation of spectrum and the first RAT based on the latency requirement of the requested service. For example, the first block of spectrum of the first allocation may include a high frequency block of mid-band or high-band spectrum for use with a 5G RAT for low latency service access, and the latency requirement may indicate that the requested service is a latency-insensitive service that can be satisfied with higher latency low-band spectrum and a 4G RAT. In this example, service optimization controller 105 may instruct 5G RAN 109 to reserve or reallocate the high frequency block of mid-band or high-band spectrum and/or 5G RAT for latency-sensitive services, and, instead, to allocate a portion of the available low-band spectrum and/or the 4G RAT for UE 101 to use in accessing the latency-insensitive service. As another example, the first block of spectrum of the first allocation may include low-band spectrum for use with a 4G RAT. In this example, the low-band spectrum and 4G RAT may be used to access services with latencies greater than a specified threshold (e.g., 20 ms). However, the latency requirement of the requested service may be less than the specified threshold. Accordingly, service optimization controller 105 may instruct 5G RAN 109 to allocate a portion of the available mid-band or high-band spectrum and/or the 5G RAT for UE 101 to use in accessing the latency-sensitive service instead of the low-band spectrum and/or 4G RAT.

Service optimization controller 105 may instruct (at 126) 5G RAN 109 to dynamically modify the spectrum and/or RAT allocation for UE 101 in response to determining (at 124) to use the second allocation of spectrum and/or the second RAT to satisfy the latency requirement of the requested service. 5G RAN 109 may provide (at 128) the second allocation of spectrum and/or the second RAT, instead of the first allocation of spectrum and/or the first RAT, for UE 101 to use in exchanging messaging for the service with 5G RAN 109.

In some embodiments, service optimization controller 105 may instruct (at 126) 5G RAN 109 and/or 5G RAN 109 may provide (at 128) the second allocation of spectrum and/or the second RAT for UE 101 to use upon predicting that UE 101 is about to commence accessing the service based on a machine learning modeling of UE 101 access patterns, a subscriber profile associated with UE 101, UE 101 type, and/or other behavioral data that may be compiled for UE 101 based on prior network 103 utilization. In some embodiments, service optimization controller 105 may instruct (at 126) 5G RAN 109 and/or 5G RAN 109 may provide (at 128) the second allocation of spectrum and/or the second RAT for UE 101 to use in response to detecting that UE 101 has commenced accessing the service, or that the first allocation of spectrum and/or the first RAT do not satisfy the latency requirement of the service after UE 101 accesses the service using the first allocation of spectrum and/or the first RAT for a period of time.

Service optimization controller 105 may produce a machine learning model based on UE 101 historically accessing the same service or service type (e.g., latency-sensitive cloud gaming services) during a particular time of day (e.g., between 6 PM and 9 PM) from a stationary location that connects via 5G RAN 109. The second allocation of spectrum and/or use of the second RAT may be based on service access that is predicted by the machine learning model with a high degree of confidence or accuracy. In some embodiments, the machine learning model may account for the type of UE that is used to access the service (e.g., the user agent, device type, device make, device model, browser version, etc.) and/or other services that are accessed by UE 101 before or concurrent with accessing a predicted service. In some embodiments, the machine learning model may also account for service access by other UEs at 5G RAN 109 and/or other RANs. For instance, a live event may occur within a coverage area of 5G RAN 109 and other UEs may be accessing a particular latency-sensitive service associated with the live event. Accordingly, the machine learning model may predict with a high degree of accuracy that UE 101 will access the same particular latency-sensitive service upon connecting to network 103 through 5G RAN 109.

Figure 2:
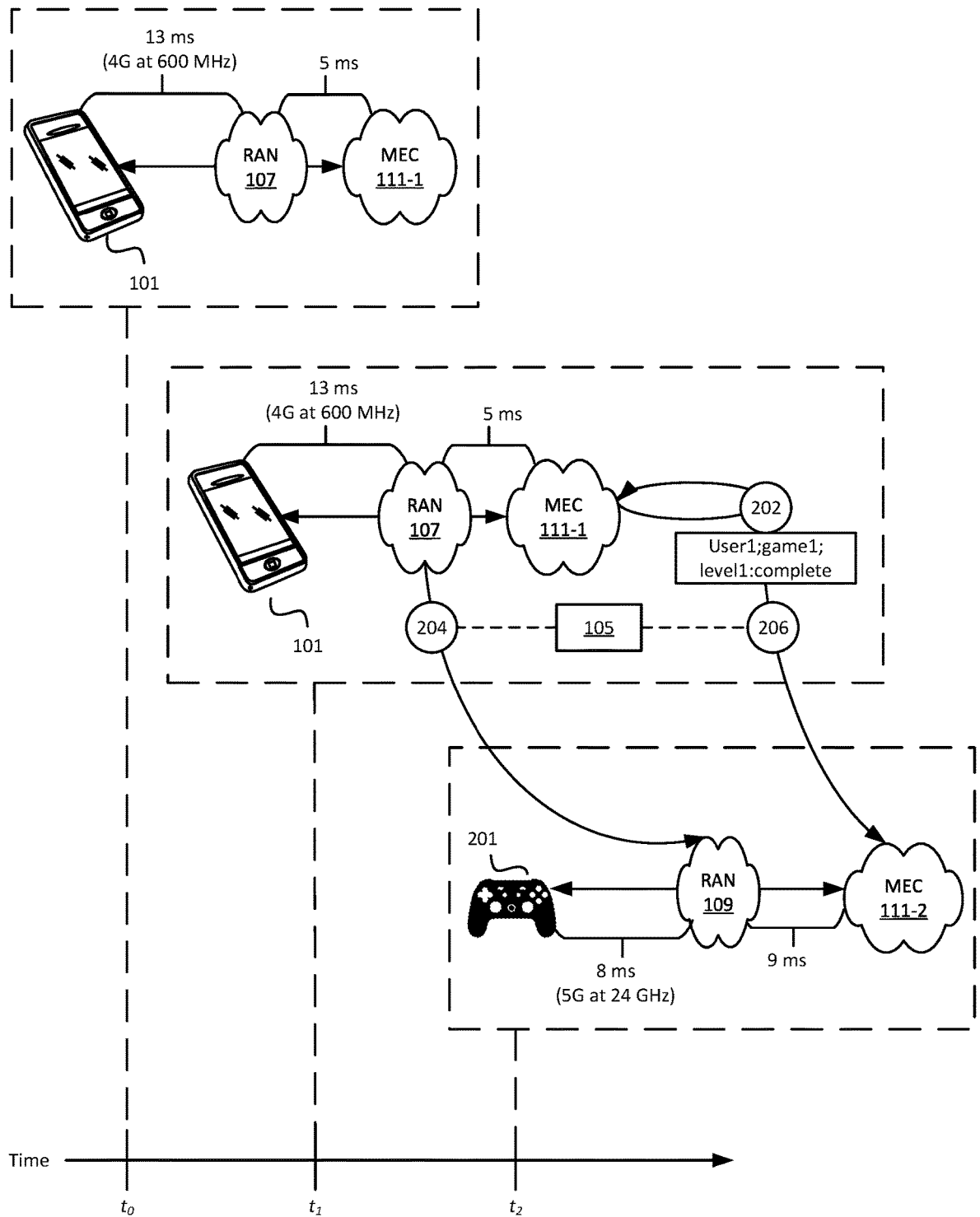
FIG. 2 illustrates an example for using the dynamic spectrum allocation and state shifting to support continued low latency access to a stateful service from different network locations in accordance with some embodiments presented herein.

FIG. 2 illustrates an example for using the dynamic spectrum allocation and state shifting to support continued low latency access to a stateful service from different network locations in accordance with some embodiments presented herein. As shown in FIG. 2, a particular game may be accessed by UE 101 via 4G RAN 107 at a first time ("t$_0$") and first location (e.g., a location corresponding to MEC 111-1). Services related to the game may accordingly be provided by MEC 111-1, and/or MEC 111-1 may track the state of the game.

4G RAN 107 and UE 101 may wirelessly exchange data using 4G signaling over low-band spectrum that is supported by 4G RAN 107 and UE 101. In this example, 13 ms of latency (e.g., average latency, median latency, etc.) may be exhibited by traffic sent between UE 101 and 4G RAN 107. Further, an additional 5 ms of latency may be exhibited by traffic sent between 4G RAN 107 and MEC 111-1. Thus, the overall latency between UE 101 and MEC 111-1 may be 18 ms.

At a subsequent time (e.g., at time "t$_1$"), the game may be paused or stopped after a first level of the game has been completed. MEC 111-1 may write (at 202) the state of the game (e.g., indicating the completion of the first level of the game) to a data structure. The data structure may link the game state to UE 101 using a unique identifier or signature of UE 101, and/or of a particular user with which the game state is associated. The unique identifier or signature may be, or may include, a network address of UE 101 (e.g., an IP address), header parameters, cookie parameters, user agent, login information, other data that differentiates the particular user from other users, and/or some combination of the above.

Stopping or pausing the game, as well as UE 101 handing off or disconnecting from RAN 107, may trigger operation of service optimization controller 105. Service optimization controller 105 may use artificial intelligence and/or machine learning to predict that the particular user will resume the game at a second time and at a second location that corresponds to 5G RAN 109 and MEC 111-2.

In some embodiments, service optimization controller 105, in conjunction with Home Subscriber Server ("HSS") and/or Unified Data Management ("UDM") components of network core 113, may build a user profile for the particular user. The user profile may be based on prior service access, locations of prior service access, and service access times. The user profile may also track the latency requirements for the different services, the access duration, and/or which RANs and/or MECs 111 were used to provide access to the different services at the different times.

Service optimization controller 105 may generate predictive models based on the frequency and regularity of the tracked data in the user profile. The predictive models may specify probabilities that the particular user will access any of the different services at one or more different locations some time in the future. The predictive model probabilities can then be adjusted based on a particular service that the particular user is currently accessing, a current location of the particular user, and the current time. For instance, the particular user may have a history of stopping the game at time "0" while at the first location, and resuming the game with a 70% probability at a later time "t2" from a second location and with a 25% probability at a time "t2" from a third location.

From the adjusted predictive models, service optimization controller 105 may determine that the particular user will resume the game at time "t2" from the second location with a sufficiently high probability (e.g., a probability that exceeds a threshold). Accordingly, at the end of time "t1", service optimization controller 105 may perform (at 204) the dynamic spectrum allocation in order to reserve and/or allocate spectrum at 5G RAN 109 that satisfies low latency performance requirements of the game. For instance, 5G RAN 109 may support lower latency RATs and higher spectrum frequencies than 4G RAN 107, and may therefore satisfy the game performance requirements by reserving and/or allocating the higher frequency spectrum for use with the lower latency RAT. Additionally, or alternatively, service optimization controller 105 may perform (at 204) the service state shifting in order to transfer the game state from MEC 111-1 to MEC 111-2. In response to receiving (at 206) the game state, MEC 111-2 may initiate an instance of the game and may configure the game to the last tracked state. In some embodiments, MEC 111-2 may provide the game state to a third-party cloud gaming platform where the game is remotely executed so that an instance of the game can be loaded at the last tracked state in the third-party cloud gaming platform and readied for the particular user to resume play.

At time "t2" and at the second location, the particular user may login to the game using different UE 201. Based on the login information, the unique signature of the particular user may be identified. Consequently, 5G RAN 109 may provide second UE 201 with the spectrum that was reserved and/or allocated (at 204) for the particular user to access the game from the second location. 8 ms of latency (e.g., average latency, median latency, etc.) may be exhibited by traffic sent between UE 201 and 5G RAN 109. An additional 9 ms of latency may be exhibited by traffic sent between 5G RAN 109 and MEC 111-2. The additional latency in accessing the game from MEC 111-2 via 5G RAN 109 than from MEC 111-1 via 4G RAN 107 may be due to MEC 111-2 having lesser or slower performing resources than MEC 111-1, and/or may be due to MEC 111-2 being located additional network hops from 5G RAN 109 than MEC 111-1 from 4G RAN 107. Nevertheless, the performance gains obtained as result of the dynamic spectrum allocation are sufficient to offset the performance loss resulting from the localized execution at MEC 111-2, and the overall latency between UE 201 and MEC 111-2 of 17 ms may satisfy the performance requirements of the low latency stateful service (e.g., the game).

Figure 3A:
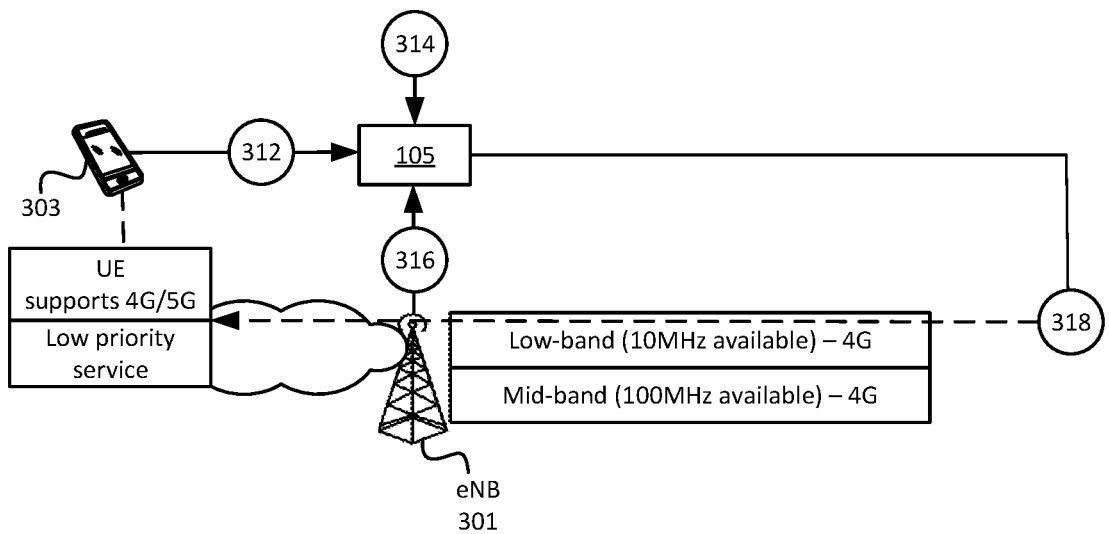
FIGS. 3A, 3B, and 3C illustrate examples for dynamic spectrum allocation in accordance with some embodiments presented herein.
Figure 3B:
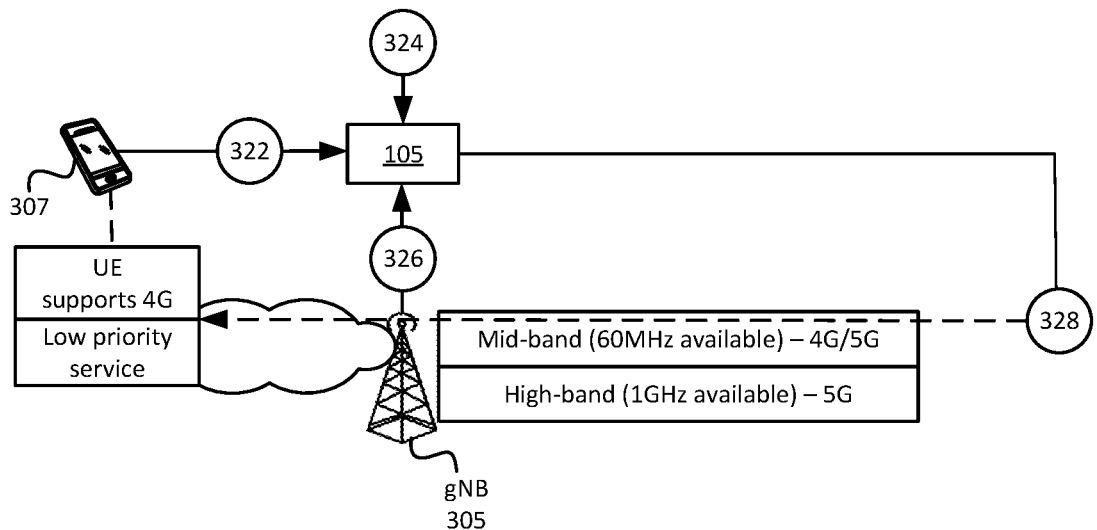
Figure 3C:
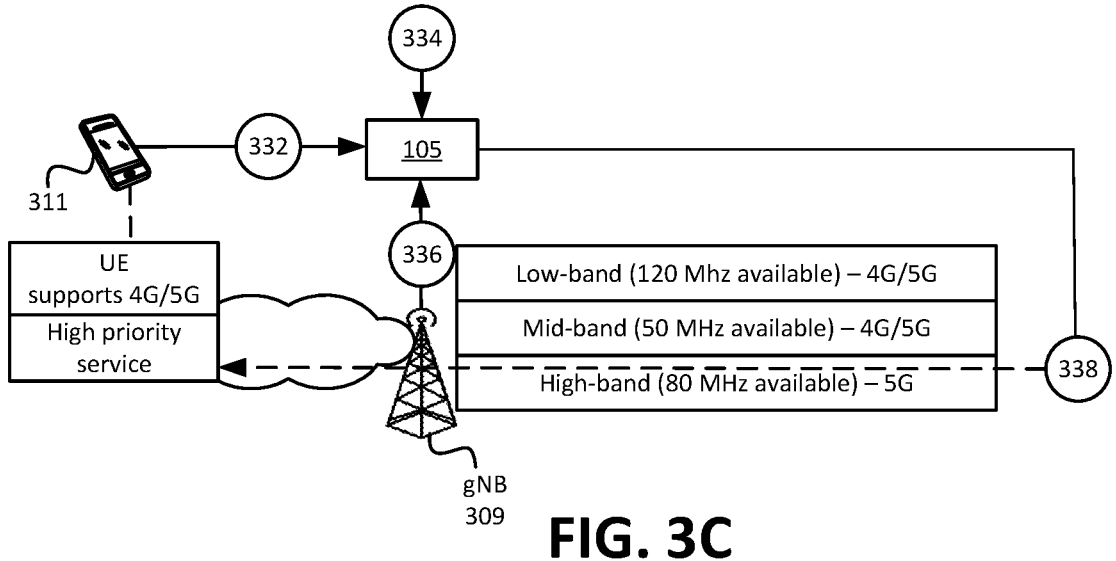

FIGS. 3A, 3B, and 3C illustrate examples for dynamic spectrum allocation based on different spectrum availability and service performance requirements at different network locations in accordance with some embodiments presented herein. FIG. 3A illustrates dynamically allocating spectrum at eNB 301 for UE 303 that supports 4G and 5G RATs and that accesses a low priority service. eNB 301 may support the 4G RAT across low-band and mid-band RF ranges. eNB 301 may have more available spectrum in the mid-band RF range than in the low-band RF range based on spectrum that has been already allocated and/or is reserved for use.

As shown in FIG. 3A, service optimization controller 105 may track (at 312) UE 303 mobility. Based on the tracked mobility, service optimization controller 105 may predict UE 303 accessing a first service upon connecting to network 103 via eNB 301. Alternatively, service optimization controller 105 may receive (at 312) a request from UE 303 to access a first service upon UE 303 establishing a network connection via eNB 301.

Service optimization controller 105 may determine performance requirements of the first service based on UE 303 or another UE accessing the first service from other network locations (e.g., other eNBs or gNBs), and the spectrum that is utilized when accessing the first service from the other network locations. In some embodiments, the performance requirements for the first service may be specified in the request URL, in a configuration file associated with the first service, metadata, and/or other data that is associated with the first service. In this example, the first service is determined to be a latency-insensitive service.

Service optimization controller 105 may obtain (at 314) a UE profile for UE 303 from HSS, UDM, and/or other components of network core 113. From the UE profile, service optimization controller 105 may determine that UE 303 supports 4G and 5G RATs and/or spectrum in the low-band, mid-band, and high-band RF ranges.

Service optimization controller 105 may obtain (at 316) or track spectrum utilization at eNB 301 in order to determine the available spectrum and RATs supported by eNB 301 and/or the services that are currently being accessed or that may be accessed at the same time as UE 303 accessing the first service when connected to eNB 301. Based on the compiled data, service optimization controller 105 may prioritize the spectrum allocation at eNB 301 to satisfy the different latency requirements of the different services that are accessed using the spectrum of eNB 301. For instance, service optimization controller 105 may dynamically allocate (at 318) and/or reserve spectrum at eNB 301 in the low-band RF range for UE 303 even though eNB 301 may have more spectrum available in the mid-band RF range than in the low-band RF range. By allocating (at 318) the low-band spectrum for UE 303 to access the latency-insensitive first service, thereby service optimization controller 105 may preserve the lower latency mid-band spectrum of eNB 301 for other UEs that may access one or more latency-sensitive services.

Other factors that may contribute to the dynamic allocation (at 318) of the low-band spectrum may include the mobility tracking of first UE 303. Service optimization controller 105 may prioritize the allocation of the low-band spectrum for first UE 303 when first UE 303 is predicted to operate at a distance from eNB 301. The low-band spectrum may penetrate farther than the mid-band spectrum, and is therefore better suited for devices that are farther away from eNB 301.

FIG. 3B illustrates dynamically allocating spectrum at gNB 305 for UE 307 that supports a 4G RAT and that accesses a low priority service. gNB 305 may support 4G and 5G RATs across low-band and mid-band RF ranges. gNB 305 may have more available spectrum in the high-band RF range than in the mid-band RF range based on spectrum that has been already allocated and/or is reserved for use.

As shown in FIG. 3B, service optimization controller 105 may track (at 322) UE 307 mobility. Based on the tracked mobility, service optimization controller 105 may predict UE 307 accessing a second service upon connecting to network 103 via gNB 305. Service optimization controller 105 may determine performance requirements of the second service, and may classify the second service as a latency-insensitive service.

Service optimization controller 105 may obtain (at 324) a UE profile for UE 307. Based on the UE profile, service optimization controller 105 may determine that UE 307 supports the 4G RAT and/or spectrum in the low-band and mid-band RF ranges.

Service optimization controller 105 may obtain (at 326) or track spectrum utilization at gNB 305 in order to determine the available spectrum and RATs supported by gNB 305 and/or the services that are currently being accessed or that may be accessed at the same time as UE 307 accessing the second service when connected to gNB 305. Based on the compiled data, service optimization controller 105 may prioritize the spectrum allocation at gNB 305 by dynamically allocating (at 328) and/or reserving spectrum at gNB 305 in the mid-band RF range for UE 307. By supporting DSS, gNB 305 can utilize the allocated (at 328) spectrum for either 4G or 5G signaling. Since second UE 307 may include only a 4G radio, the allocated (at 328) spectrum may be used to transfer 4G signaling between UE 307 and gNB 305 and by allocated to transfer 5G signaling with other UEs that support the 5G RAT.

Although not shown in FIG. 3B, service optimization controller 105 may determine that low-band RF spectrum may be used to satisfy the latency requirements for the second service that is accessed by UE 307, and may determine that the low-band RF spectrum of gNB 307 is currently allocated or reserved for other UEs. Service optimization controller 105 may reprioritize the spectrum allocation by identifying low-band RF spectrum that is allocated or reserved for a particular UE that is expected to access a higher priority service than UE 307. Accordingly, service optimization controller 105 may cause gNB 305 to switch the spectrum allocation for the particular UE from the low-band RF spectrum to the mid-band RF spectrum, and may allocate or reserve the freed low-band RF spectrum for UE 307. In this manner, gNB 305 may reprioritize future and/or current spectrum based on changing performance requirements for services accessed by newly identified UEs.

FIG. 3C illustrates dynamically allocating spectrum at gNB 309 for UE 311 that supports 4G and 5G RATs and that accesses a high priority service. gNB 309 may support 4G and 5G RATs across available low-band, mid-band, and high-band RF ranges.

As shown in FIG. 3C, service optimization controller 105 may track (at 332) UE 311 mobility, and may predict UE 311 accessing a third service upon connecting to network 103 via gNB 309. Service optimization controller 105 may determine performance requirements of the third service, and may classify the third service as a latency-sensitive service.

Service optimization controller 105 may obtain (at 334) a UE profile for UE 311 that identifies UE 311 as supporting the 4G and 5G RATs and/or spectrum in the low-band, mid-band, and high-band RF ranges. Service optimization controller 105 may obtain (at 336) or track spectrum utilization at gNB 309.

Service optimization controller 105 may determine that the latency requirements for the third latency-sensitive service accessed by UE 311 may be satisfied with high-band RF spectrum and the 5G RAT. Accordingly, service optimization controller 105 may dynamically allocate (at 334) spectrum in the high-band RF range from gNB 309 for use by UE 311.

In some embodiments, service optimization controller 105 may account for the distance of UE 311 from gNB 309 and/or an expected duration that UE 311 may access the latency-sensitive service when determining between an allocation of high-band RF spectrum and mid-band RF spectrum. For instance, if UE 311 operates within a fixed short distance of gNB 309 and is expected to access the latency-sensitive service for a long duration (e.g., more than 5 minutes), then service optimization controller 105 may select the high-band spectrum of gNB 309 to allocate to UE 311. However, if UE 311 is expected to be transitory, then service optimization controller 105 may select the mid-band spectrum of gNB 309 to allocate to UE 311 because the longer range of the mid-band spectrum may result a more consistent experience when accessing the service from a farther distance.

Figure 4:
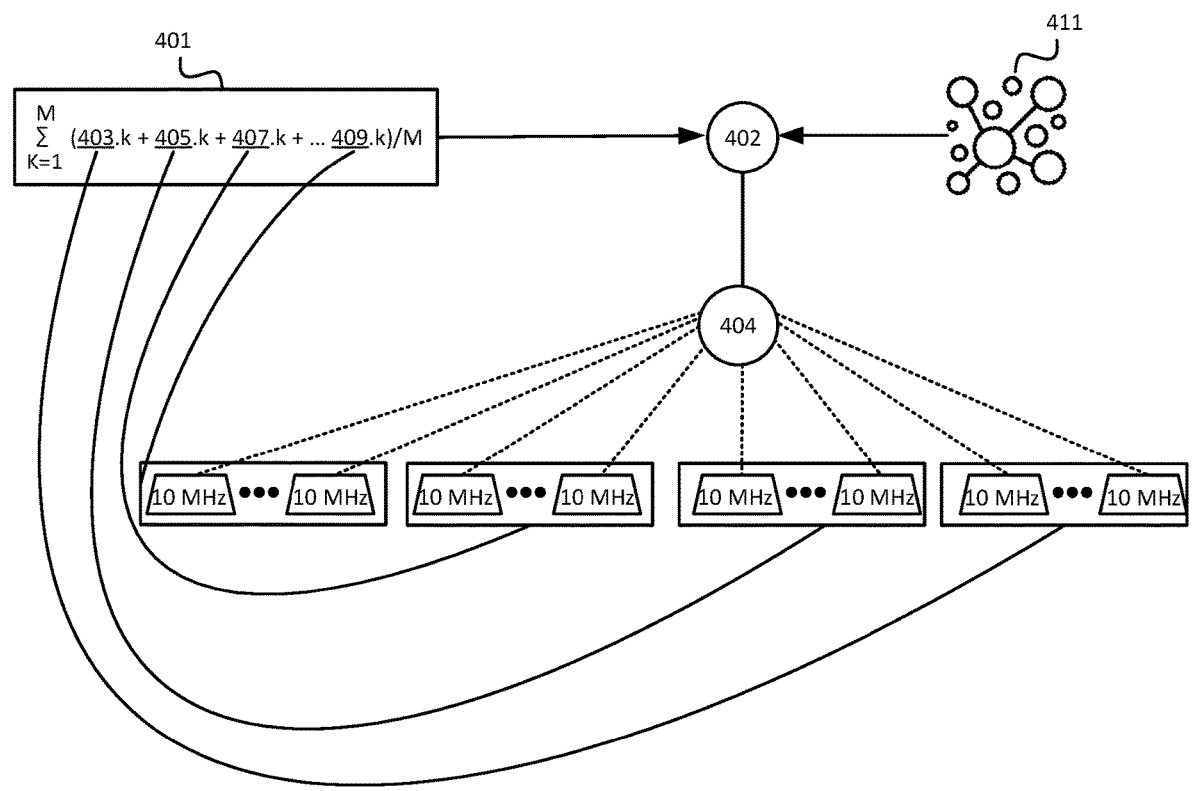
FIG. 4 illustrates an example for performing the dynamic spectrum allocation based on a modeling of spectrum utilization and availability in accordance with some embodiments presented herein.

In some embodiments, service optimization controller 105 may prioritize, reserve, and/or allocate spectrum based on predictive models of spectrum utilization that are generated for each RAN using artificial intelligence and/or machine learning. FIG. 4 illustrates an example for performing the dynamic spectrum allocation based on a modeling of spectrum utilization and availability in accordance with some embodiments presented herein.

FIG. 4 includes an example for modeling spectrum block usage, advertising of unused spectrum blocks, soft and/or hard reservation of spectrum blocks for a mobility-tracked UE, wherein each spectrum block may correspond to a block or range of frequency that may be allocated and used for UE service access. In particular, model 401 may include variables 403, 405, 407, and 409 that represent the used, available, and/or reserved spectrum for different blocks available at a particular RAN. Variable 403 may represent the used, available, and/or reserved spectrum for the kth instance of a low-band spectrum block, variable 405 may represent the used, available, and/or reserved spectrum for the kth instance of a mid-band spectrum block, variable 407 may represent the used, available, and/or reserved spectrum for the kth instance of a high-band spectrum block, and variable 409 may represent the used, available, and/or reserved spectrum for the kth instance of a spectrum block of another cell. For instance, variable 409 may represent the used, available, and/or reserved spectrum for the kth instance of a spectrum block of a Citizens Broadband Radio Service ("CBRS") cell. Model 401 may aggregate variables 403, 405, 407, and 409, and may apportion based on the total spectrum at the particular RAN (shown as "M" in FIG. 4).

Model 401 may model spectrum blocks of the particular RAN that are available, used, and/or reserved for future allocation. The model may be compared (at 402) against one or more predictive models 411 that are generated based on past spectrum utilization at the particular RAN at similar times and/or spectrum utilization by some of the same UEs that are allocated spectrum blocks in formula 401. Predictive models 411 may be generated and/or stored in a repository that is located at the particular RAN, service optimization controller 105, or network core 113.

Predictive models 411 may provide probabilities for different UEs accessing services with different performance requirements at different times. For instance, predictive models 411 may include clusters that predict a first set of UEs accessing a first set of latency-sensitive services with a first probability at a first time, accessing the first set of latency-sensitive services with a second probability at a second time, accessing a second set of latency-insensitive services with a third probability at the first time, and accessing the second set of latency-insensitive services with a fourth probability at the second time.

Predictive models 411 may also include clusters that identify probabilities of when services with different performance requirements are accessed. For instance, predictive models 411 may predict autonomous driving services being accessed with a first probability during a first time, the autonomous driving services being accessed with a second probability during a second time, gaming services being accessed with a third probability during the first time, and the gaming services being accessed with a fourth probability during the second time.

Service optimization controller 105 may modify (at 404) the spectrum prioritization, reservation, and/or allocation based on the comparison of the model generated by formula 401 and predictive models 411. For instance, the autonomous driving and gaming services may be classified as latency-sensitive services. However, service optimization controller 105 may prioritize high frequency and lower latency spectrum for the autonomous driving services during the first time, and may therefore identify any high frequency spectrum that is allocated and/or reserved for UEs with a high probability of accessing the gaming service during the first time, and may instead allocate and/or reserve lower frequency spectrum for those UEs, thereby reserving the high frequency spectrum for UEs accessing the autonomous driving services during the first time. Accordingly, a particular UE that accesses a particular service may be allocated a first spectrum block during a first time, and a different second spectrum block during a second time based on the changing spectrum availability and the services accessed from the particular RAN.

Figure 5:
FIG. 5 illustrates an example of a weighted prioritization of spectrum for the dynamic spectrum allocation in accordance with some embodiments presented herein.

FIG. 5 illustrates an example of a model 401 using weighted prioritization of spectrum for the dynamic spectrum allocation in accordance with some embodiments presented herein. As shown in FIG. 5, different weights 503, 505, 507, and 509 may be assigned to variables 403, 405, 407, and 409 of model 401. Weights 503, 505, 507, and 509 may be used to prioritize the availability or utilization of one set of spectrum blocks or spectrum band over others.

In some implementations, weighting may be used to account for the availability of a particular RAT over time and geography—for example, 5G capabilities may be deployed over a period of time, and the number of UEs with 5G radios that may utilize high-band spectrum blocks 407 may be a fraction of the number of UEs with 4G radios that may utilize low-band spectrum blocks 403 and/or mid-band spectrum blocks 405. Accordingly, weights 503, 505, 507, and 509 may be adjusted so that high-band spectrum blocks 407 are allocated to any UE that may utilize high-band spectrum blocks 407 regardless of whether that UE is accessing a latency-sensitive service, a latency-insensitive service, or another service.

As another example, available mid-band spectrum at a particular RAN may be far less than available low-band spectrum at the particular RAN. Weight 505 for mid-band spectrum blocks 405 may be increased relative to weight 503 for low-band spectrum blocks 403 to skew the resulting model such that mid-band spectrum blocks 405 are reserved exclusively for low latency service access by a set of UEs and/or specific services with the greatest performance requirements.

Service optimization controller 105 may control the state shifting that occurs between MECs 111. In some embodiments, service optimization controller 105 may trigger a direct exchange of service state between MECs 111. In some embodiments, service optimization controller 105 may act as a proxy for indirectly exchanging service state between MECs 111.

Figure 6:
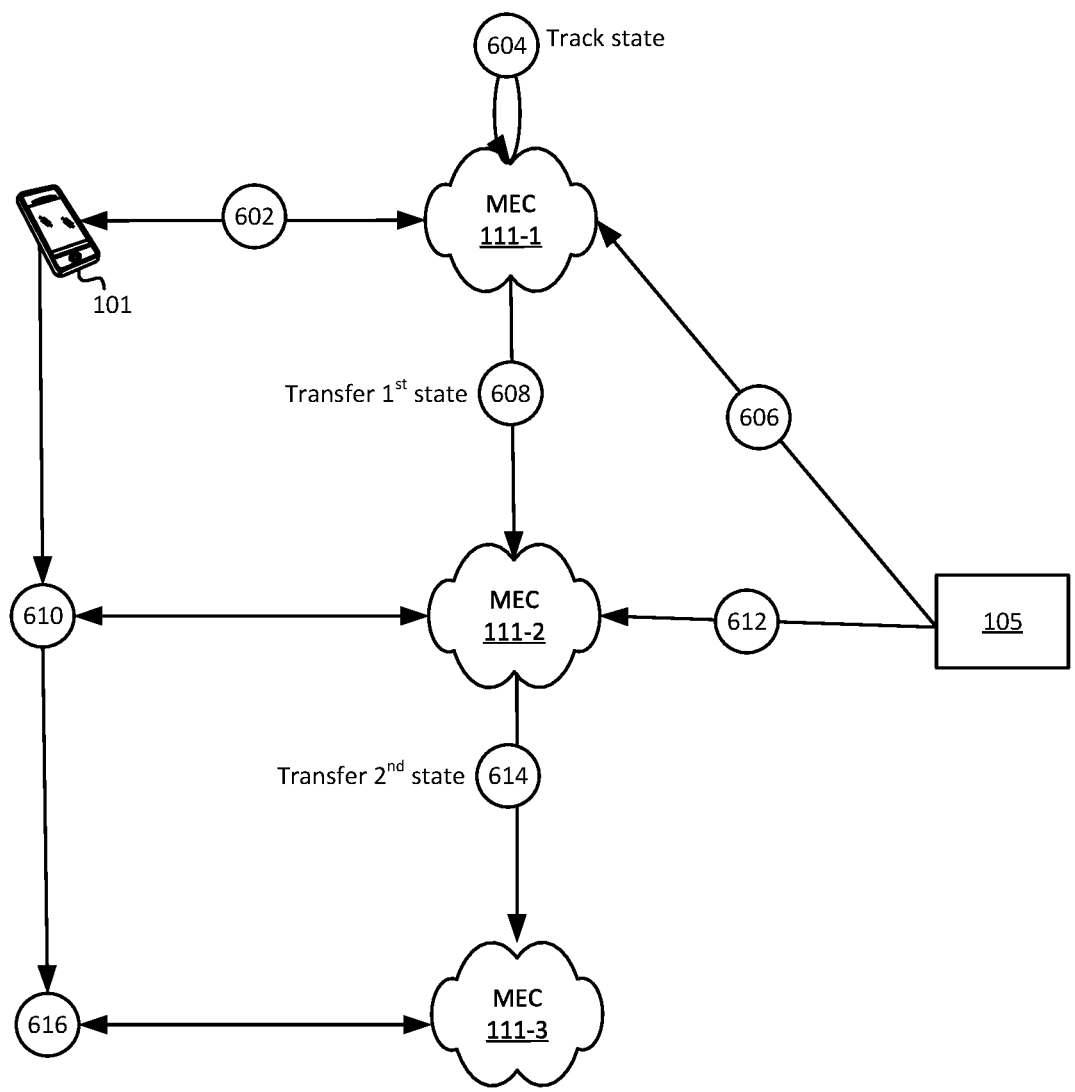
FIGS. 6 and 7 illustrate examples of shifting service state for continued low latency access of a stateful service from different locations in accordance with some embodiments presented herein.

FIG. 6 illustrates an example for the direct exchange of service state between MECs 111 in accordance with some embodiments presented herein. As shown in FIG. 6, MECs 111 may establish and/or retain a network connection with one another or may establish and/or retain a network connection with at least a neighboring set of MECs 111 in order to directly shift service state from one MEC to another. In some embodiments, MECs 111 may be interconnected via express virtual networks. The transfer of service state may be conducted using a representational state transfer ("REST") or RESTful HTTP-based protocol.

UE 101 may initiate access (at 602) to a stateful service. First MEC 111-1 may track (at 604) a current state of the stateful service and/or may locally execute the stateful service while UE 101 remains within a first region and/or accesses (at 602) the stateful service using one of a first set of RANs.

Service optimization controller 105 may perform mobility tracking of UE 101. Service optimization controller 105 may predict UE 101 moving to a second region and/or accessing the stateful service using one of a second set of RANs. Service optimization controller 105 may identify second MEC 111-2 as the MEC that is most geographically proximate to and/or provides lowest latency services to UEs in the second region or the second set of RANs. In some embodiments, service optimization controller 105 may store, in a database or configuration file, a mapping between different MECs 111 and different service regions and/or RANs, wherein the mapping may identify which MECs 111 provide lowest latency and/or fastest performance for different service regions and/or RANs. The mapping may store addressing information by which the MECs 111 may directly communicate.

Service optimization controller 105 may issue (at 606) a state transfer message to MEC 111-1. The state transfer message may include a first identifier that identifies the service state subject to transfer (e.g., state for the stateful service accessed by UE 101), and/or a second identifier that identifies MEC 111-2 as the recipient of the identified service state. In response to state transfer message, first MEC 111-1 may transfer (at 608) a first state for the stateful service accessed by UE 101 to MEC 111-2, where the first state corresponds to the last tracked state of the stateful service at MEC 111-1.

MEC 111-2 may configure resources to prepare the stateful service for execution from the first state. UE 101 may resume accessing (at 610) the stateful service from second MEC 111-2 without interruption or delay as a result of the service state having been shifted from first MEC 111-1 to second MEC 111-2. Second MEC 111-2 may update the service state as a result of the continued access (at 610) by UE 101.

Service optimization controller 105 may continue to track movements of UE 101, and may predict UE 101 moving to a third region and/or accessing the stateful service using one of a third set of RANs that are linked to third MEC 111-3. Service optimization controller 105 may provide (at 612) a second state transfer message to MEC 111-2. The second state transfer message may include a first identifier that identifies the service state to transfer, and a second identifier that identifies MEC 111-3 as a recipient of the service state.

In response to the second state transfer message, second MEC 111-2 may transfer (at 614) a second updated state for the stateful service accessed by UE 101 to third MEC 111-3, wherein the second state transferred by MEC 111-2 is different than the first state transferred by MEC 111-1.

MEC 111-3 may configure resources to prepare the stateful service for execution from the second state, and UE 101 may resume accessing the stateful service from third MEC 111-3 without interruption or delay as a result of the service state having been transferred (at 614) from second MEC 111-2 to third MEC 111-3. Third MEC 111-3 may then update the service state as a result of the continued access (at 616) by UE 101.

Figure 7:
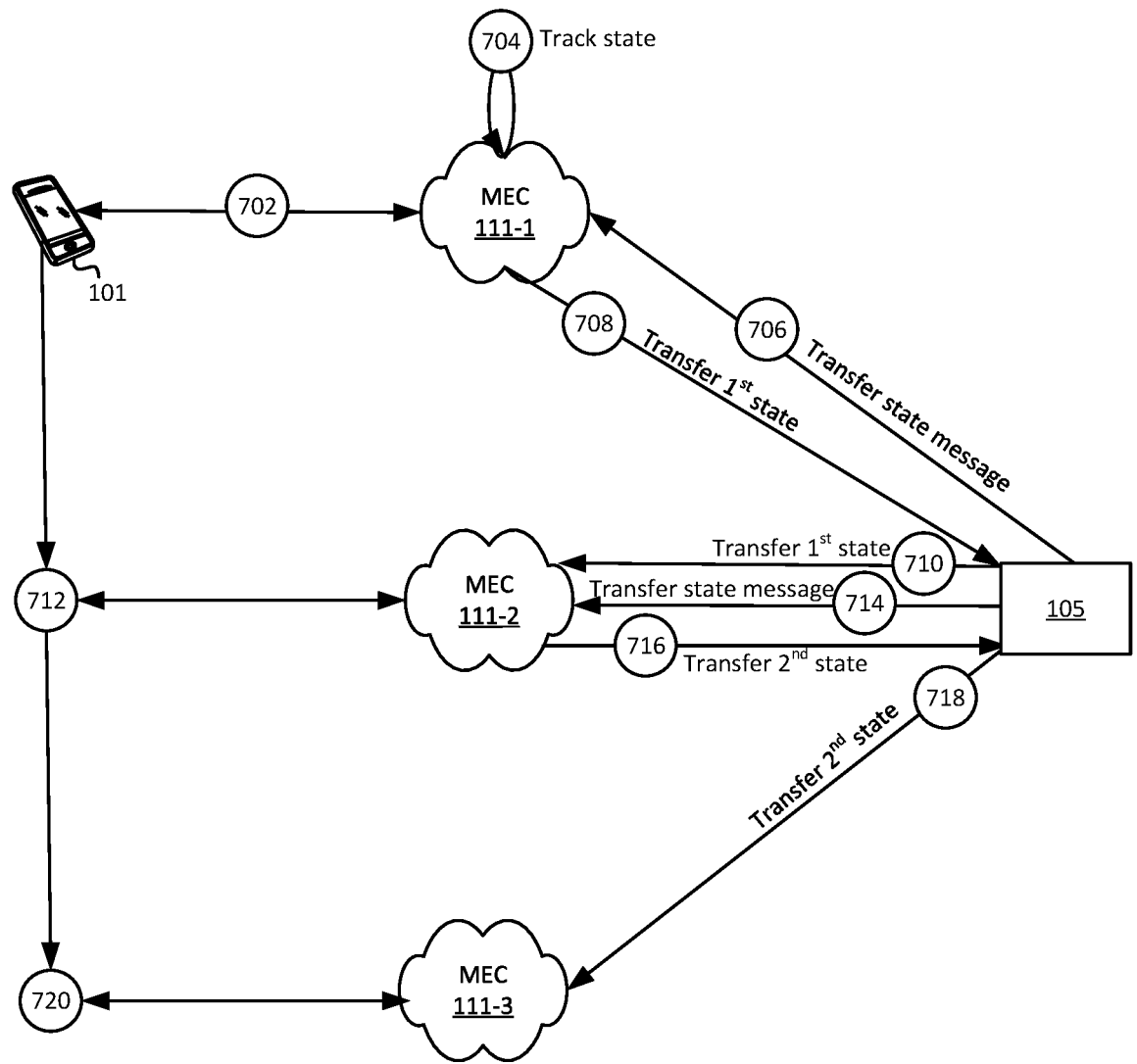

FIG. 7 illustrates an example for the indirect exchange of service state between MECs 111 in accordance with some embodiments presented herein. As shown in FIG. 7, MECs 111 may provide service state to service optimization controller 105, and service optimization controller 105 may transfer the service state to the appropriate MEC 111 where the stateful service is expected to resume.

For instance, UE 101 may initiate access (at 702) to a particular stateful service. First MEC 111-1 may track (at 704) the service state and/or locally execute the particular stateful service for UE 101 during an initial access time.

Service optimization controller 105 may track movement of UE 101, and may predict UE 101 accessing the particular stateful service from a second region or second RAN that is linked to second MEC 111-2. Service optimization controller 105 may provide (at 706) a state transfer message to first MEC 111-1. The state transfer message may identify UE 101, and/or may request the current state for the particular stateful service and/or other stateful services accessed by UE 101.

In response to the state transfer message, first MEC 111-1 may provide (at 708) service optimization controller 105 with first state corresponding to the last state that is tracked for the particular stateful service accessed by UE 101 at first MEC 111-1. Service optimization controller 105 may forward (at 710) the service state to second MEC 111-2, and MEC 111-2 may configure resources to ready the particular state service for execution.

UE 101 may continue and/or resume accessing (at 712) the particular stateful service from second MEC 111-2. Second MEC 111-2 may update the service state and/or may locally execute the particular stateful service for UE 101 based on the first state that was provided (at 708) by first MEC 111-1.

At a later time and based on further mobility tracking of UE 101, service optimization controller 105 may predict UE 101 accessing the particular stateful service from a third region or third RAN that is linked to third MEC 111-3. Service optimization controller 105 may provide (at 714) a state transfer message to second MEC 111-2. The state transfer message may identify UE 101, and/or may request the current state for the particular stateful service and/or other stateful services accessed by UE 101.

In response to the state transfer message, second MEC 111-2 may provide (at 716) service optimization controller 105 with second state corresponding to the updated state tracked for the particular stateful service accessed by UE 101 at second MEC 111-2. Service optimization controller 105 may forward (at 718) the second state to third MEC 111-3 for seamless continued access (at 720) of the particular stateful service by UE 101 from third MEC 111-3.

Figure 8A:
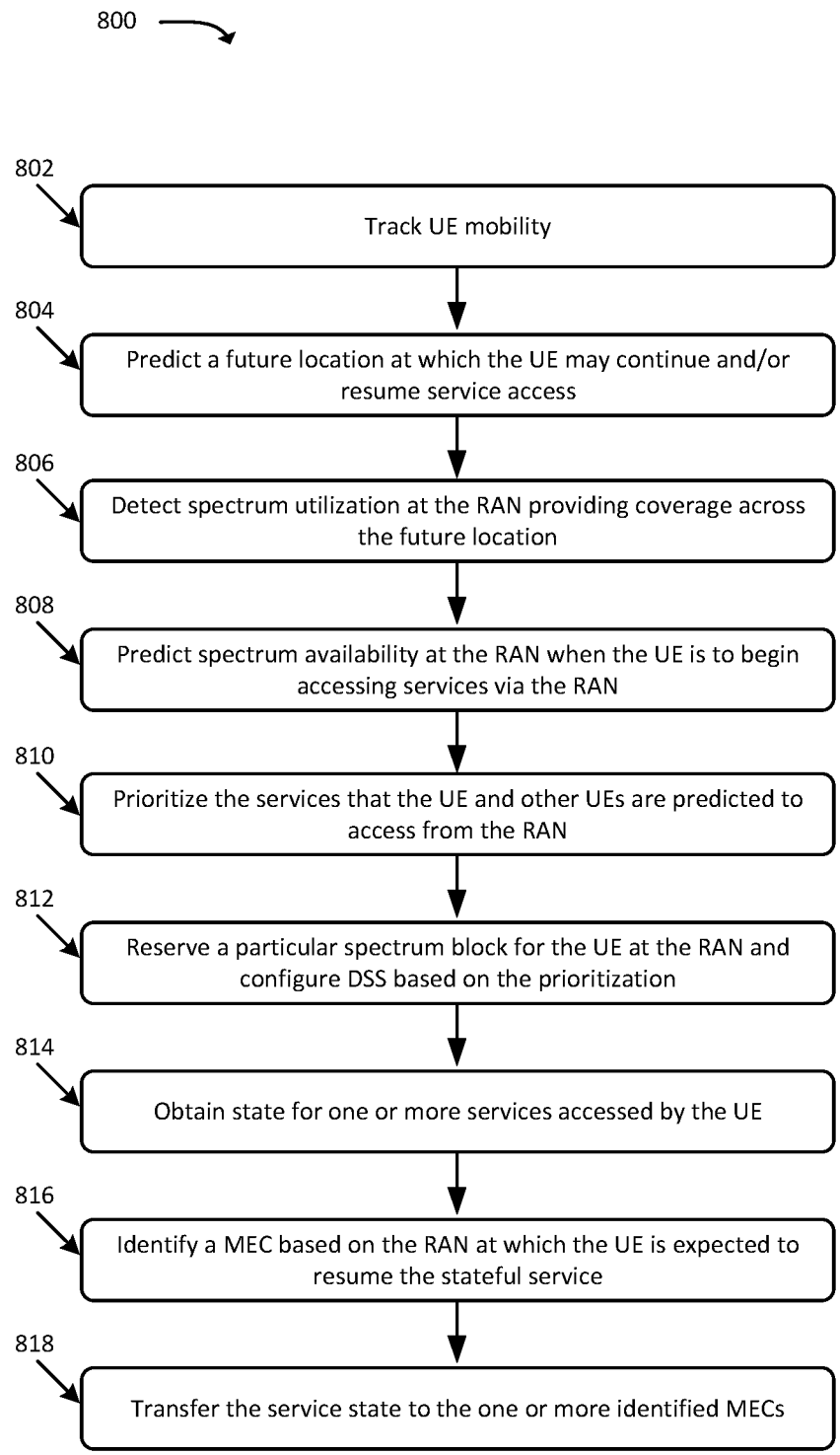
FIG. 8A presents an example process for providing high quality stateful services to a User Equipment ("UE") moving across different network locations via dynamic spectrum sharing and state shifting in accordance with some embodiments.

FIG. 8A presents an example process 800 for providing high quality stateful services to a UE moving across different network locations via DSS and state shifting in accordance with some embodiments. Process 800 may be performed by service optimization controller 105.

Process 800 may include tracking (at 802) mobility of a particular UE. The particular UE may include a UE that is connected to network 103 via a particular RAN and/or that accesses a stateful service. In some embodiments, the mobility tracking (at 802) may be based on signal strength measurements obtained from one or more RANs in communication with the particular UE. For instance, the mobility tracking (at 802) may be based on handover mechanisms that determine when to handoff the particular UE from one RAN to another RAN. In some embodiments, mobility tracking (at 802) may be based on location data that is obtained from location services of the particular UE. Mobility tracking (at 802) may be based on comparing the tracked movements of the particular UE against historic movements complied for that particular UE.

Process 800 may include predicting (at 804) one or more locations at which the particular UE may continue and/or resume service access based on the mobility tracking (at 802). Specifically, predicting (at 804) the future service access locations may include comparing a current trajectory of the particular UE or a current location from which the particular UE accesses a particular service to past tracked trajectories and/or times and locations of service access. A detected pattern between current and past movements and/or service access may be used to predict (at 804) future locations and/or future access by the particular UE.

Process 800 may include detecting (at 806) spectrum utilization at one or more RANs that provide wireless coverage across the one or more predicted locations. Different numbers of UEs may access services from different RANs, different RANs may support different RATs (e.g., 5G, 4G, etc.), different RANs may have different total amounts of spectrum, and/or different RANs may have different amounts of spectrum for each of the RF ranges. Accordingly, the spectrum utilization may differ at different RANs and at different times.

Process 800 may include predicting (at 808) spectrum availability at the one or more RANs at the time at which the particular UE is predicted to access services using spectrum from the one or more RANs. The prediction of spectrum availability may be derived in part from artificial intelligence and/or machine learning of historic spectrum utilization at the one or more RANs and/or different UEs and services that are accessed at different times using spectrum from the one or more RANs. For instance, predictive models may be generated from the historic usage, and the predictive models may provide probabilities that different UEs will access services with different performance requirements at different times using spectrum from the one or more RANs. Accordingly, the predicted spectrum availability may be derived from the detected (at 806) spectrum utilization, the probabilities that a set of UEs with an allocation of spectrum from the one or more RANs will continue to access services, and/or the probabilities that other UEs utilize spectrum of the one or more RANs for future service access.

Process 800 may include prioritizing (at 810) the services that the particular UE and other UEs are predicted to access from the one or more RANs. Prioritizing (at 810) the services may include ranking the services in terms of latency and/or other performance requirements. For instance, prioritizing (at 810) the services may include differentiating the services as low priority or latency-insensitive services that are not impacted by latencies greater than a specified threshold (e.g., 20 ms), and as high priority or latency-sensitive services that are impacted by latencies greater than the specified threshold. Prioritizing (at 810) the services may further include determining spectrum blocks that and supported RATs that satisfy the latency and/or performance requirements of the services.

Process 800 may include reserving (at 812) a particular spectrum block for the particular UE at the one or more RANs based on the prioritization (at 810). The particular spectrum block may include spectrum with frequencies that satisfy the latency and/or other requirements of the service predicted to be accessed by the particular UE from the one or more RANs. Reserving (at 812) the particular spectrum block may also include configuring DSS at the one or more RANs when the one or more RANs support different RATs, and the particular spectrum block may be allocated to UEs that communicate using the different RATs.

Process 800 may include obtaining (at 814) state for one or more services accessed by the particular UE. Service optimization controller 105 may query the MEC of a RAN currently allocating spectrum to the particular UE for any service state tracked for that particular UE. As noted above, the service state may include data for continuing or resuming a service at a different MEC location, and may further include resource utilization associated with execution of the service at one or more MEC locations.

Process 800 may include identifying (at 816) one or more MECs based on the one or more RANs at which the particular UE is expected to resume the stateful service. The MECs may be collocated with the one or more RANs, may be geographically proximate to the one or more predicted RANs relative to other MECs, and/or may provide lowest latency or optimal performance to the one or more predicted RANs relative to other MECs.

Process 800 may include transferring (at 818) the service state to the identified one or more MECs. Transferring (at 818) the service state may include issuing a state transfer message that instructs the MEC with the current state to provide the current state to the one or more identified MECs where the particular UE is predicted to continue and/or resume the stateful service.

Figure 8B:
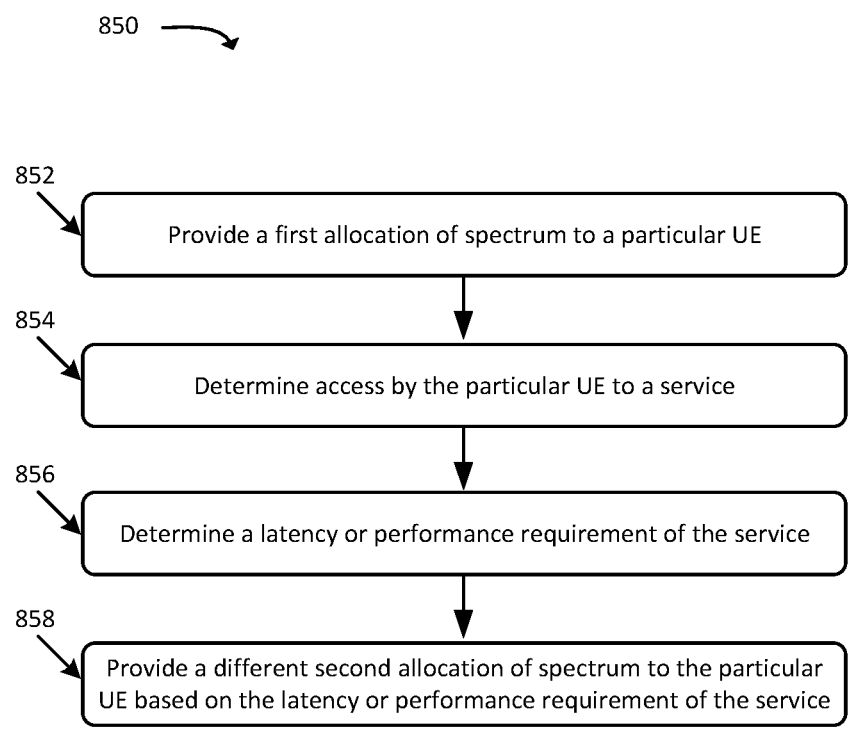
FIG. 8B presents an example process for providing high quality stateful services to a stationary UE by dynamically changing the spectrum allocation based on a latency requirement of one or more services accessed by the UE in accordance with some embodiments.

FIG. 8B presents an example process 850 for providing high quality stateful services to a stationary UE by dynamically changing the spectrum allocation based on a latency requirement of one or more services accessed by the UE in accordance with some embodiments. Process 850 may be performed by service optimization controller 105.

Process 850 may include providing (at 852) a first allocation of spectrum to a particular UE upon that particular UE establishing connectivity to network 103 via a particular RAN of network 103. Providing (at 852) the first allocation of spectrum may include allocating a first block of spectrum in a RF range that is supported by the particular UE and that is available at the particular RAN. Providing (at 852) the first allocation of spectrum may further include configuring the first block of spectrum for use with a first RAT that is supported by the particular RAN and the particular UE.

In some embodiments, the first allocation of spectrum may be selected and/or based on a predicted service that the particular UE is to access and latency requirements of the predicted service. In some embodiments, the first allocation of spectrum may be selected upon or prior to the particular UE requesting access to a service based on available spectrum at the particular RAN, spectrum supported by the particular UE, services accessed by other UEs via the particular RAN, a UE profile, and/or other criteria.

Process 850 may include determining (at 854) access by the particular UE to a service. For instance, the particular UE may issue a request for service access and/or one or more messages related to an accessed service using the first allocation of spectrum. Service optimization controller 105 may receive an indication of the requested or accessed service from the issued request and/or one or more messages. In some embodiments, service optimization controller 105 may determine access to the service based on a request URL, message data, a service identifier, and/or network data for facilitating the service access.

Process 850 may include determining (at 856) a latency or performance requirement of the service. The latency or performance requirement of the service may be stored in a mapping table or may be determined (at 856) from tracking prior service access by the particular UE and/or other UEs. In some embodiments, the latency or performance requirement may be determined (at 856) based on allocation of MEC resources or other resources used to support the service access.

Process 850 may include providing (at 858) a different second allocation of spectrum to the particular UE based on the latency or performance requirement of the service. Providing (at 858) the second allocation of spectrum may include allocating a second block of spectrum for exchanging messaging of the service with the particular RAN. The second block of spectrum may use a different portion of the RF range than the first block of spectrum for the first allocation. The second block of spectrum may be selected from available RF spectrum at the particular RAN that is supported by the particular UE. In some embodiments, service optimization controller 105 may select the second block of spectrum according to the latency or performance requirement indicating a latency-sensitive or latency-insensitive service, and/or may select the second block of spectrum to include frequencies that are associated with latencies in closer range of the latency or performance requirement of the service than latencies associated with the first block of spectrum. For instance, service optimization controller 105 may select higher frequency spectrum for the second block of spectrum than for the first block of spectrum based on the latency or performance requirement indicating a latency-sensitive service or a service that requires latency less than a specified threshold, and may select lower frequency spectrum for the second block of spectrum than for the first block of spectrum based on the latency or performance requirement indicating a latency-insensitive or service that accepts latency greater than the specified threshold. Providing (at 858) the second allocation of spectrum may also include configuring the second block of spectrum for use with a different second RAT, that is supported by the particular RAN and the particular UE, based on the latency or performance requirement. For instance, service optimization controller 105 may select the second RAT, instead of the first RAT, for use with the second allocation of spectrum in response to the latency requirement being greater than or less than a threshold amount.

The particular UE may use the second allocation of spectrum to access the service with different latency than when using the first allocation of spectrum, wherein the latency associated with accessing the service using the second allocation of spectrum may increase when the latency or performance requirement is greater than a threshold amount and may decrease when the latency or performance requirement is less than the threshold amount. Process 850 may be repeated in response to the latency requirement of the accessed service not being satisfied by the second allocation of spectrum and/or in response to the particular UE switching to and accessing a different service with a different latency or performance requirement.

Figure 9:
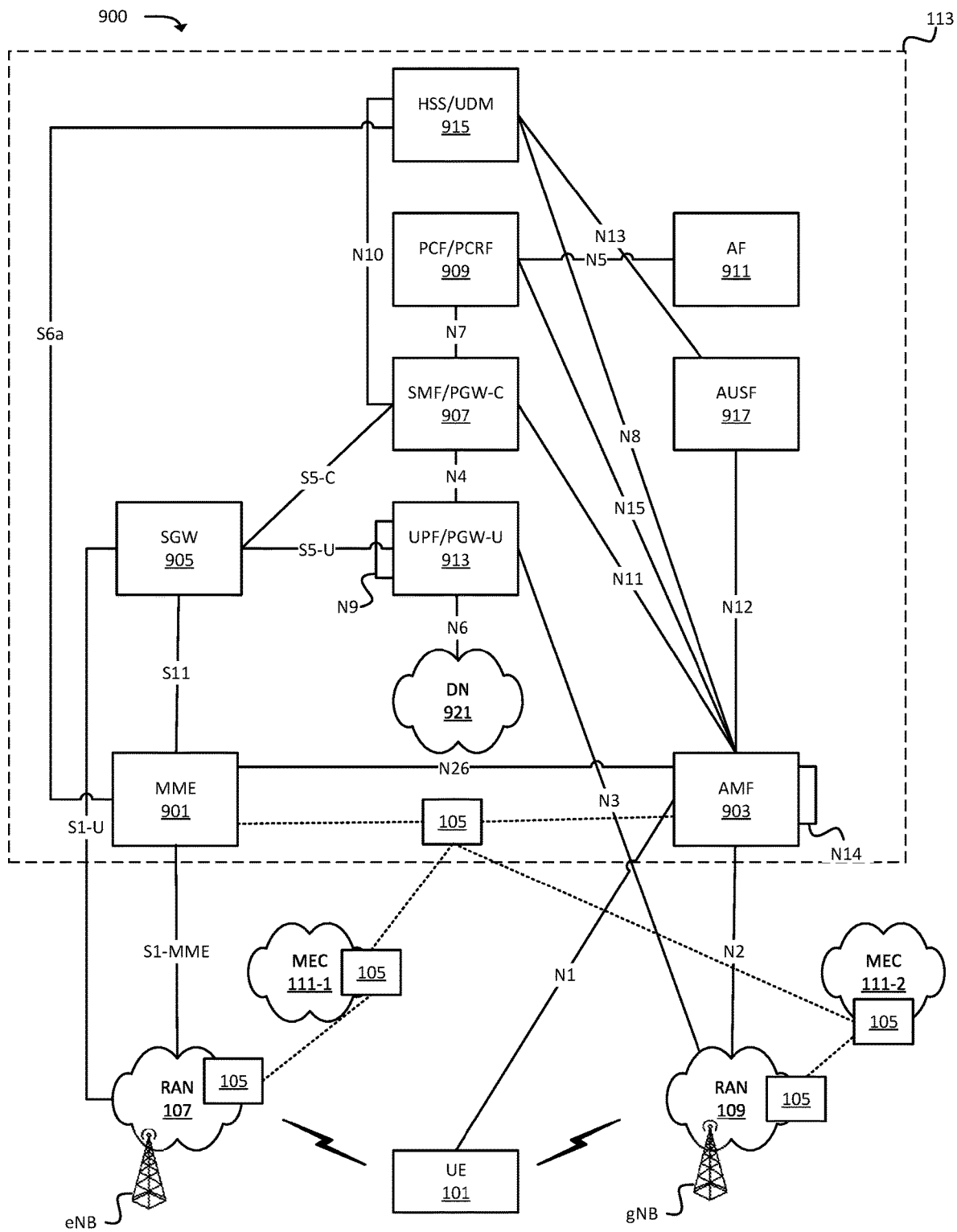
FIG. 9 illustrates an example environment, in which one or more embodiments may be implemented.

FIG. 9 illustrates an example environment 900, in which one or more embodiments may be implemented. In some embodiments, environment 900 may correspond to a 5G network, and/or may include elements of a 5G network. In some embodiments, environment 900 may correspond to a 5G NSA architecture, in which a 5G RAT may be used in conjunction with one or more other RATs (e.g., a LTE RAT), and/or in which elements of a 5G network core may be implemented by, may be communicatively coupled with, and/or may include elements of another type of network core (e.g., an Evolved Packet Core ("EPC")).

As shown, environment 900 may include UE 101, one or more instances of service optimization controller 105, RAN 107 (which may include one or more eNBs), RAN 109 (which may include one or more gNBs), MECs 111, network core 113, and Data Network ("DN") 921. Network core 113 may include MME 901, AMF 903, Serving Gateway ("SGW") 905, SMF/Packet Data Network ("PDN") Gateway ("PGW")-Control plane function ("PGW-C") 907, Policy Control Function ("PCF")/Policy Charging and Rules Function ("PCRF") 909, Application Function ("AF") 911, User Plane Function ("UPF")/PGW-User plane function ("PGW-U") 913, Home Subscriber Server ("HSS")/Unified Data Management ("UDM") 915, and Authentication Server Function ("AUSF") 917. In some embodiments, PGW-U 913 and PGW-C 907 may correspond to a Control and User Plane Separation ("CUPS") architecture.

The quantity of devices and/or networks, illustrated in FIG. 9, is provided for explanatory purposes only. In practice, environment 900 may include additional devices and/or networks, fewer devices and/or networks, different devices and/or networks, or differently arranged devices and/or networks than illustrated in FIG. 9. For example, while not shown, environment 900 may include devices that facilitate or enable communication between various components shown in environment 900, such as routers, modems, gateways, switches, hubs, etc.

In some embodiments, one or more of the devices of environment 900 may perform one or more functions described as being performed by another one or more of the devices of environment 900. Devices of environment 900 may interconnect with each other and/or other devices via wired connections, wireless connections, or a combination of wired and wireless connections. In some implementations, one or more devices of environment 900 may be physically integrated in, and/or may be physically attached to, one or more other devices of environment 900.

UE 101 may include a portable computing and communication device, such as a personal digital assistant ("PDA"), a "smart" phone, a cellular phone, a laptop computer, a tablet computer, etc. UE 101 may also include a non-portable computing device, such as a desktop computer, a consumer or business appliance, a "smart" television, a set-top box, a gaming device, or another device that has the ability to connect to network 103. UE 101 may, in some embodiments, include a computing and communication device that may be worn by a user (also referred to as "wearable" devices) such as a watch, a fitness band, a necklace, glasses, a ring, a belt, a headset, and/or another type of wearable device.

The one or more instances of service optimization controller 105 may control the dynamic spectrum allocation that is performed at RAN 107, RAN 109, and/or other RANs, and may control the transfer of service state between MECs 111. In some embodiments, service optimization controller 105 may be a distributed device or function that executes at or in conjunction with RAN 107, RAN 109, MECs 111, and/or components of network core 113. For instance, different distributed instances of service optimization controller 105 running at or in conjunction with RAN 107, MME 901, AMF 903, and SMF/PGW-C 907 may control the dynamic spectrum allocation at RAN 107. Similarly, different distributed instance of service optimization controller 105 running at or in conjunction with MECs 111, MME 901, AMF 903, and HSS/UDM 915 may control the transfer of service state between MECs 111. In some such embodiments, service optimization controller 105 may be integrated as part of eNBs, gNBs, MECs 111, and/or one or more components of network core 103. In some embodiments, service optimization controller 105 may be a standalone device that interfaces with the eNBs, gNBs, MECs 111, and/or one or more components of network core 103.

RAN 107 may be, or may include, a 4G RAN that includes one or more base stations (e.g., one or more eNBs), via which UE 101 may communicate with one or more other elements of environment 900. UE 101 may communicate with RAN 107 via an air interface and allocated spectrum (e.g., as provided by an eNB). For instance, RAN 107 may receive traffic (e.g., voice call traffic, data traffic, messaging traffic, signaling traffic, etc.) from UE 101 using the allocated spectrum, and may communicate the traffic to UPF/PGW-U 913, and/or one or more other devices or networks. Similarly, RAN 107 may receive traffic intended for UE 101 (e.g., from UPF/PGW-U 913, AMF 903, and/or one or more other devices or networks) and may communicate the traffic to UE 101 using the allocated spectrum.

RAN 109 may be, or may include, a 5G RAN that includes one or more base stations (e.g., one or more gNBs), via which UE 101 may communicate with one or more other elements of environment 900. UE 101 may communicate with RAN 109 via an air interface and allocated spectrum (e.g., as provided by an gNB). For instance, RAN 109 may receive traffic (e.g., voice call traffic, data traffic, messaging traffic, signaling traffic, etc.) from UE 101 using the allocated spectrum, and may communicate the traffic to UPF/PGW-U 913, and/or one or more other devices or networks. Similarly, RAN 107 may receive traffic intended for UE 101 (e.g., from UPF/PGW-U 913, AMF 903, and/or one or more other devices or networks) and may communicate the traffic to UE 101 using the allocated spectrum.

MME 901 may include one or more devices, systems, VNFs, etc., that perform operations to register UE 101 with the EPC, to establish bearer channels associated with a session with UE 101, to hand off UE 101 from the EPC to another network, to hand off UE 101 from another network to the EPC, manage mobility of UE 101 between RANs 107 and/or 109, and/or to perform other operations.

SGW 905 may include one or more devices, systems, VNFs, etc., that aggregate traffic received from one or more eNBs and send the aggregated traffic to an external network or device via UPF/PGW-U 913. Additionally, SGW 905 may aggregate traffic received from one or more UPF/PGW-Us 913 and may send the aggregated traffic to one or more eNBs. SGW 905 may operate as an anchor for the user plane during inter-eNB handovers and as an anchor for mobility between different telecommunication networks or RANs (e.g., RANs 107 and 109).

AMF 903 may include one or more devices, systems, Virtualized Network Functions ("VNFs"), etc., that perform operations to register UE 101 with the network, to establish bearer channels associated with a session with UE 101, to hand off UE 101 from the network to another network, to hand off UE 101 from the other network to the network, and/or to perform other operations. In some embodiments, the network may include multiple AMFs 903, which communicate with each other via the N14 interface (denoted in FIG. 9 by the line marked "N14" originating and terminating at AMF 903).

SMF/PGW-C 907 may include one or more devices, systems, VNFs, etc., that gather, process, store, and/or provide information in a manner described herein. SMF/PGW-C 907 may, for example, facilitate in the establishment of communication sessions on behalf of UE 101. In some embodiments, the establishment of communications sessions may be performed in accordance with one or more policies provided by PCF/PCRF 909.

PCF/PCRF 909 may include one or more devices, systems, VNFs, etc., that aggregate information to and from the network and/or other sources. PCF/PCRF 909 may receive information regarding policies and/or subscriptions from one or more sources, such as subscriber databases and/or from one or more users (such as, for example, an administrator associated with PCF/PCRF 909).

AF 911 may include one or more devices, systems, VNFs, etc., that receive, store, and/or provide information that may be used in determining parameters (e.g., quality of service parameters, charging parameters, or the like) for certain applications.

UPF/PGW-U 913 may include one or more devices, systems, VNFs, etc., that receive, store, and/or provide data (e.g., user plane data). For example, UPF/PGW-U 913 may receive user plane data (e.g., voice call traffic, data traffic, etc.), destined for UE 101, from DN 921, and may forward the user plane data toward UE 101 (e.g., via RAN 109, SMF/PGW-C 907, and/or one or more other devices). In some embodiments, multiple UPFs 913 may be deployed (e.g., in different geographical locations), and the delivery of content to UE 101 may be coordinated via the N9 interface (e.g., as denoted in FIG. 9 by the line marked "N9" originating and terminating at UPF/PGW-U 913). Similarly, UPF/PGW-U 913 may receive traffic from UE 101 (e.g., via RAN 109, SMF/PGW-C 907, and/or one or more other devices), and may forward the traffic toward DN 921. In some embodiments, UPF/PGW-U 913 may communicate (e.g., via the N4 interface) with SMF/PGW-C 907, regarding user plane data processed by UPF/PGW-U 913.

HSS/UDM 915 and AUSF 917 may include one or more devices, systems, VNFs, etc., that manage, update, and/or store, in one or more memory devices associated with AUSF 917 and/or HSS/UDM 915, profile information associated with a subscriber. AUSF 917 and/or HSS/UDM 915 may perform authentication, authorization, and/or accounting operations associated with the subscriber and/or a communication session with UE 101.

DN 921 may include one or more wired and/or wireless networks. For example, DN 921 may include an Internet Protocol ("IP")-based PDN, a wide area network ("WAN") such as the Internet, a private enterprise network, and/or one or more other networks. UE 101 may communicate, through DN 921, with data servers, other UEs 101, and/or to other servers or applications that are coupled to DN 921. DN 921 may be connected to one or more other networks, such as a public switched telephone network ("PSTN"), a public land mobile network ("PLMN"), and/or another network. DN 921 may be connected to one or more devices, such as content providers, applications, web servers, and/or other devices, with which UE 101 may communicate.

Figure 10:
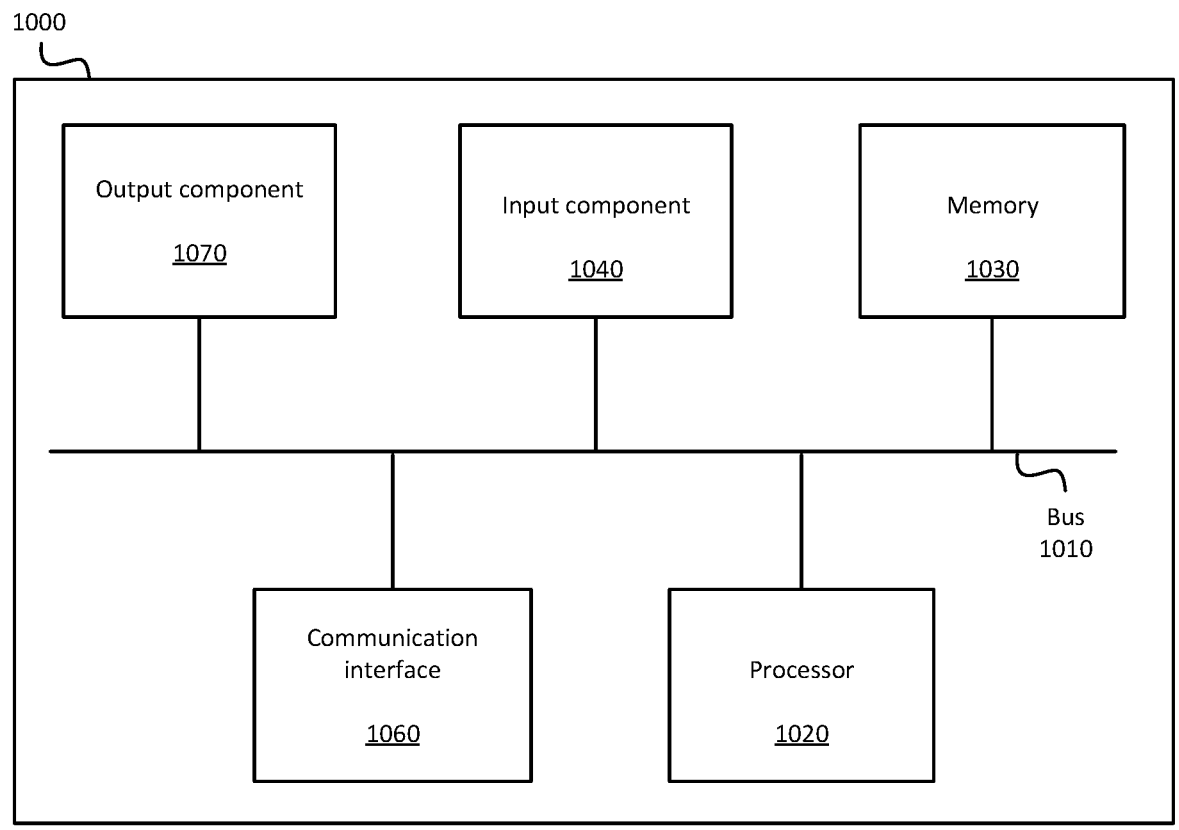
FIG. 10 illustrates example functional components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1070, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000, such as a keyboard, a keypad, a button, a switch, etc. Output component 1070 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 2, 3, and 5-7), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
   one or more processors configured to:
   provide a first allocation of spectrum to a User Equipment ("UE") establishing connectivity to a wireless network via a first Radio Access Network ("RAN") of the wireless network, wherein the first RAN supports a plurality of frequency ranges of radio-frequency ("RF") spectrum for use with a plurality of radio access technologies ("RATs");
   determine access by the UE to a service;
   determine a latency requirement of the service;
   provide, based on the latency requirement, a different second allocation of spectrum to the UE for use with a particular RAT of the plurality of RATs in exchanging messaging of the service with the first RAN, wherein the second allocation of spectrum uses a different portion of the RF spectrum than the first allocation of spectrum, and wherein latencies associated with the second allocation of spectrum are within closer range of the latency requirement than latencies associated with the first allocation of spectrum;
   predict continued access of the service by the UE from a particular location outside a coverage area of the first RAN and inside a coverage area of a second RAN;
   select the second allocation of spectrum for messaging exchanged between the UE and the second RAN based on the predicted continued access; and
   transfer a state of the service from a first Multi-Access Edge Computing facility ("MEC") to a second MEC based on the predicted continued access,
   wherein the first MEC tracks the state of the service while the UE uses the second allocation of spectrum from the first RAN to access the service,
   wherein the second MEC provides a second amount of latency for services accessed via the second RAN, and
   wherein accessing the service with a first amount of latency provided by the second allocation of spectrum and the second amount of latency provided by the second MEC satisfies the latency requirement of the service.

2. The device of claim 1, wherein the service is a first service, wherein the latency requirement is a first latency requirement, and wherein the one or more processors are further configured to:
   determine access by the UE to a second service after completing access to the first service;
   determine a second latency requirement of the second service that is different than the first latency requirement of the first service;
   provide a third allocation of spectrum to the UE for messaging of the second service that is exchanged with the first RAN based on the latency requirement of the second service, wherein the third allocation of spectrum uses a different portion of the RF spectrum than either the first allocation of spectrum or the second allocation of spectrum, and wherein latencies associated with the third allocation of spectrum are within closer range of the second latency requirement than latencies associated with the first allocation of spectrum or the second allocation of spectrum.

3. The device of claim 1, wherein the one or more processors are further configured to:
   update the state of the service at the first MEC in response to the UE accessing the service using the first allocation of spectrum from the first RAN; and
   update the state of the service at the second MEC in response to the UE accessing the service using the second allocation of spectrum from the second RAN.

4. The device of claim 1, wherein the one or more processors are further configured to:

resume execution of the service at the second MEC from the particular state that is obtained from the first MEC in response to the UE using the second allocation of spectrum from the second RAN; and update the state of the service at the second MEC in response to resuming the execution.

5. The device of claim 1, wherein the state comprises one or more of:

data that was previously provided by the UE while accessing the service using the second allocation of spectrum from the first RAN; and data that modifies a progression, position, or time within the service.

6. The device of claim 1, wherein predicting the continued access includes:

analyzing historic movements of the UE;

analyzing historic service access by the UE; and determining the continued access based on historic movements to the particular location and based on the historic service access indicating the continued access of the service from the particular location.

7. The device of claim 1, wherein transferring the particular state includes:

providing a state transfer message to the first MEC, the state transfer message comprising a first identifier that identifies state of the particular stateful service accessed by the UE, and a second identifier that identifies the second MEC.

8. The device of claim 1, wherein the one or more processors are further configured to:

select a first RAT of the plurality of RATs for use with the second allocation of spectrum in response to the latency requirement being greater than a threshold amount; and select a second RAT of the plurality of RATs for use with the second allocation of spectrum in response to the latency requirement being less than the threshold amount.

9. The device of claim 8, wherein the first RAT is a 5G RAT, and wherein the second RAT is a 4G RAT.

10. The device of claim 1, wherein providing the second allocation of spectrum includes:

allocating low-band spectrum in response to the latency requirement being greater than a threshold amount; and allocating mid-band spectrum or high-band spectrum in response to the latency requirement being less than the threshold amount.

11. The device of claim 10, wherein the low-band spectrum only comprises frequencies below a particular frequency; and wherein the mid-band spectrum and the high-band spectrum comprise frequencies above the particular frequency.

12. A device, comprising:

one or more processors configured to:

provide a first allocation of spectrum to a User Equipment ("UE") establishing connectivity to a wireless network via a first Radio Access Network ("RAN") of the wireless network, wherein the first RAN supports a plurality of frequency ranges of radio-frequency ("RF") spectrum for use with a plurality of radio access technologies ("RATs");

determine access by the UE to a service;

determine a latency requirement of the service, wherein determining the latency requirement includes:

monitoring utilization of the RF spectrum by the UE or another UE accessing the service; and provide, based on the latency requirement, a different second allocation of spectrum to the UE for use with a particular RAT of the plurality of RATs in exchanging messaging of the service with the first RAN, wherein the second allocation of spectrum uses a different portion of the RF spectrum than the first allocation of spectrum, and wherein latencies associated with the second allocation of spectrum are within closer range of the latency requirement than latencies associated with the first allocation of spectrum.

13. A non-transitory computer-readable medium, storing a plurality of processor-executable instructions, which, when executed by one or more processors, cause the one or more processors to:

provide a first allocation of spectrum to a User Equipment ("UE") establishing connectivity to a wireless network via a first Radio Access Network ("RAN") of the wireless network, wherein the first RAN supports a plurality of frequency ranges of radio-frequency ("RF") spectrum for use with a plurality of radio access technologies ("RATs");

determine access by the UE to a service;

determine a latency requirement of the service provide, based on the latency requirement, a different second allocation of spectrum to the UE for use with a particular RAT of the plurality of RATs in exchanging messaging of the service with the first RAN, wherein the second allocation of spectrum uses a different portion of the RF spectrum than the first allocation of spectrum, and wherein latencies associated with the second allocation of spectrum are within closer range of the latency requirement than latencies associated with the first allocation of spectrum;

predict continued access of the service by the UE from a particular location outside a coverage area of the first RAN and inside a coverage area of a second RAN;

select the second allocation of spectrum for messaging exchanged between the UE and the second RAN based on the predicted continued access; and transfer a state of the service from a first Multi-Access Edge Computing facility ("MEC") to a second MEC based on the predicted continued access, wherein the first MEC tracks the state of the service while the UE uses the second allocation of spectrum from the first RAN to access the service, wherein the second MEC provides a second amount of latency for services accessed via the second RAN, and wherein accessing the service with a first amount of latency provided by the second allocation of spectrum and the second amount of latency provided by the second MEC satisfies the latency requirement of the service.

14. The non-transitory computer-readable medium of claim 13, wherein the processor-executable instructions further include processor-executable instructions to:

select a first RAT of the plurality of RATs for use with the second allocation of spectrum in response to the latency requirement being greater than a threshold amount; and select a second RAT of the plurality of RATs for use with the second allocation of spectrum in response to the latency requirement being less than the threshold amount.

15. The non-transitory computer-readable medium of claim 13, wherein the processor-executable instructions to provide the different second allocation of spectrum further include processor-executable instructions to:
  allocate low-band spectrum in response to the latency requirement being greater than a threshold amount; and
  allocate mid-band spectrum or high-band spectrum in response to the latency requirement being less than the threshold amount.

16. A method, comprising:
providing a first allocation of spectrum to a User Equipment ("UE") establishing connectivity to a wireless network via a first Radio Access Network ("RAN") of the wireless network, wherein the first RAN supports a plurality of frequency ranges of radio-frequency ("RF") spectrum for use with a plurality of radio access technologies ("RATs");
determining access by the UE to a service;
determining a latency requirement of the service
providing, based on the latency requirement, a different second allocation of spectrum to the UE for use with a particular RAT of the plurality of RATs in exchanging messaging of the service with the first RAN, wherein the second allocation of spectrum uses a different portion of the RF spectrum than the first allocation of spectrum, and wherein latencies associated with the second allocation of spectrum are within closer range of the latency requirement than latencies associated with the first allocation of spectrum;
predicting continued access of the service by the UE from a particular location outside a coverage area of the first RAN and inside a coverage area of a second RAN;
selecting the second allocation of spectrum for messaging exchanged between the UE and the second RAN based on the predicted continued access; and
transferring a state of the service from a first Multi-Access Edge Computing facility ("MEC") to a second MEC based on the predicted continued access,
  wherein the first MEC tracks the state of the service while the UE uses the second allocation of spectrum from the first RAN to access the service,
  wherein the second MEC provides a second amount of latency for services accessed via the second RAN, and
  wherein accessing the service with a first amount of latency provided by the second allocation of spectrum and the second amount of latency provided by the second MEC satisfies the latency requirement of the service.

17. The method of claim 16, wherein the service is a first service, wherein the latency requirement is a first latency requirement, the method further comprising:
determining access by the UE to a second service after completing access to the first service;
determining a second latency requirement of the second service that is different than the first latency requirement of the first service;
providing a third allocation of spectrum to the UE for messaging of the second service that is exchanged with the first RAN based on the latency requirement of the second service,
  wherein the third allocation of spectrum uses a different portion of the RF spectrum than either the first allocation of spectrum or the second allocation of spectrum, and
  wherein latencies associated with the third allocation of spectrum are within closer range of the second latency requirement than latencies associated with the first allocation of spectrum or the second allocation of spectrum.

18. The method of claim 16, further comprising:
updating the state of the service at the first MEC in response to the UE accessing the service using the first allocation of spectrum from the first RAN; and
updating the state of the service at the second MEC in response to the UE accessing the service using the second allocation of spectrum from the second RAN.

19. A device, comprising:
one or more processors configured to:
  identify a User Equipment ("UE") that receives access to a particular service via a first radio access network ("RAN") of the wireless network;
  predict continued access of the service by the UE from a particular location outside a coverage area of the first RAN and inside a coverage area of a second RAN of the wireless network;
  select a particular allocation of spectrum for messaging exchanged between the UE and the second RAN based on the predicted continued access; and
  transfer a state of the service from a first Multi-Access Edge Computing facility ("MEC") to a second MEC based on the predicted continued access,
    wherein the first MEC tracks the state of the service while the UE uses the particular allocation of spectrum from the first RAN to access the service,
    wherein the second MEC provides a first amount of latency for services accessed via the second RAN, and
    wherein accessing the service with a second amount of latency provided by the second allocation of spectrum and the first amount of latency provided by the second MEC satisfies a latency requirement of the service.

20. The device of claim 19, wherein the first RAN is associated with first radio access technology ("RAT"), and wherein the second RAN is associated with a second RAT.

21. The device of claim 19, wherein the one or more processors are further configured to:
update the state of the service at the second MEC in response to the UE accessing the service using the particular allocation of spectrum from the second RAN.

* * * * *